United States Patent
Lee et al.

(10) Patent No.: US 11,571,879 B2
(45) Date of Patent: Feb. 7, 2023

(54) FILM FOR LAMINATED GLASS, METHOD OF MANUFACTURING EMBOSSING PATTERNS OF FILM FOR LAMINATED GLASS, METHOD OF MANUFACTURING EMBOSSING PATTERN TRANSFER DEVICE, AND EMBOSSING PATTERN TRANSFER DEVICE

(71) Applicant: SKC Co., Ltd., Suwon-si (KR)

(72) Inventors: Haksoo Lee, Suwon-si (KR); Sungjin Chung, Seoul (KR)

(73) Assignee: SKC CO., LTD., Suwon-si (KR)

(*) Notice: Subject to any disclaimer, the term of this patent is extended or adjusted under 35 U.S.C. 154(b) by 0 days.

(21) Appl. No.: 17/141,755

(22) Filed: Jan. 5, 2021

(65) Prior Publication Data
US 2021/0129503 A1 May 6, 2021

Related U.S. Application Data

(63) Continuation of application No. PCT/KR2019/008284, filed on Jul. 5, 2019.

(30) Foreign Application Priority Data

Jul. 6, 2018 (KR) .................... 10-2018-0078655

(51) Int. Cl.
*B32B 17/10* (2006.01)
*B32B 38/06* (2006.01)
(Continued)

(52) U.S. Cl.
CPC ........ *B32B 17/10587* (2013.01); *B29C 59/02* (2013.01); *B32B 17/10* (2013.01);
(Continued)

(58) Field of Classification Search
CPC .............. B32B 17/10; B32B 17/10587; B32B 17/10761; B32B 17/10807; B32B 38/06;
(Continued)

(56) References Cited

U.S. PATENT DOCUMENTS

| | | | |
|---|---|---|---|
| 5,425,977 A | 6/1995 | Hopfe | |
| 6,863,956 B1* | 3/2005 | Nakajima | B32B 17/10761 428/167 |
| 2009/0324889 A1* | 12/2009 | Stenzel | B32B 17/10577 428/167 |

FOREIGN PATENT DOCUMENTS

| | | |
|---|---|---|
| CA | 806005 A | 2/1969 |
| JP | 2000-203902 A | 7/2000 |

(Continued)

OTHER PUBLICATIONS

International Search Report dated Oct. 30, 2019, in counterpart International Patent Application No. PCT/KR2019/008284 (3 pages in English and 4 pages in Korean).

(Continued)

*Primary Examiner* — Frank J Vineis
*Assistant Examiner* — Donald M Flores, Jr.
(74) *Attorney, Agent, or Firm* — NSIP Law

(57) ABSTRACT

A film for laminated glass, the film including a surface embossing pattern formed on at least a portion of one side of the film, wherein the surface embossing pattern comprises convexities, and concavities separating the convexities from one another, each of the convexities is surrounded by some of the concavities, and an average area of the convexities is 0.01 $mm^2$ to 4.00 $mm^2$.

16 Claims, 8 Drawing Sheets

(51) Int. Cl.
*B29C 59/02* (2006.01)
*B29K 31/00* (2006.01)

(52) U.S. Cl.
CPC .. *B32B 17/10761* (2013.01); *B32B 17/10807* (2013.01); *B32B 38/06* (2013.01); *B29K 2031/00* (2013.01); *B32B 2307/538* (2013.01)

(58) Field of Classification Search
CPC .............. B32B 2307/538; B29C 59/02; B29K 2031/00
USPC ....... 428/141, 156, 163, 167, 169, 212, 213, 428/214, 220
See application file for complete search history.

(56) References Cited

FOREIGN PATENT DOCUMENTS

| | | |
|---|---|---|
| JP | 3414592 B2 | 6/2003 |
| JP | 2003-238218 A | 8/2003 |
| JP | 2013-180925 A | 9/2013 |
| KR | 10-0488187 B1 | 5/2005 |
| KR | 10-0609112 B1 | 8/2006 |
| KR | 10-2006-0110016 A | 10/2006 |
| KR | 10-1115095 B1 | 2/2012 |
| KR | 10-2017-0022971 A | 3/2017 |
| KR | 10-2017-0066279 A | 6/2017 |
| KR | 10-2017-0069176 A | 6/2017 |

OTHER PUBLICATIONS

Written Opinion of the International Searching Authority dated Oct. 30, 2019, in counterpart International Patent Application No. PCT/KR2019/008284 (7 pages in English and 5 pages in Korean).

* cited by examiner

FILM FOR LAMINATED GLASS, METHOD OF MANUFACTURING EMBOSSING PATTERNS OF FILM FOR LAMINATED GLASS, METHOD OF MANUFACTURING EMBOSSING PATTERN TRANSFER DEVICE, AND EMBOSSING PATTERN TRANSFER DEVICE

CROSS-REFERENCE TO RELATED APPLICATIONS

Pursuant to 35 USC 120 and 365(c), this application is a continuation of International Application No. PCT/KR2019/008284 filed on Jul. 5, 2019, and claims the benefit under 35 USC 119(a) of Korean Application No. 10-2018-0078655 filed on Jul. 6, 2018, in the Korean Intellectual Property Office, the entire disclosures of which are incorporated herein by reference for all purposes.

BACKGROUND

1. Field

This application relates to a film for laminated glass, a method of manufacturing embossing patterns of a film for laminated glass, a method of manufacturing an embossing pattern transfer device, and an embossing pattern transfer device. The embossing patterns and the embossing pattern transfer device make it possible to manufacture a film for laminated glass having an excellent deaeration performance and an excellent edge sealing characteristic and in which diffraction interference fringes caused by embossing patterns are hardly generated.

2. Description of Related Art

Polyvinyl acetals are being used as laminated glass (safety glass) or interlayers of light transmitting laminates (films for laminated glass). Laminated glass is mainly used for windows and cladding of buildings and window glass of automobiles, and can increase safety by minimizing damage or injury to objects or people inside the buildings or automobiles due to characteristics such as few or no fragments are scattered by an impact on the laminated glass, and penetration of the laminated glass is prevented for an impact up to a certain strength.

An interlayer for laminated glass includes multiple fine embossings formed to improve performance of preventing blocking between interlayers from the surface thereof, workability of handling when an interlayer is allowed to be overlapped with a glass plate (the degree of sliding when used with a glass plate), and deaeration performance when an interlayer is laminated to a glass plate.

When an interlayer on which an embossing pattern has been formed is used as an interlayer for laminated glass, interference fringes or bubbles may be generated due to embossings formed on both sides of the interlayer, and visibility may be degraded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for laminated glass includes a surface embossing pattern formed on at least a portion of one side of the film, wherein the surface embossing pattern includes convexities, and concavities separating the convexities from one another, each of the convexities is surrounded by some of the concavities, and an average area of the convexities is 0.01 mm$^2$ to 4.00 mm$^2$.

The concavities may intersect with each other to form lines, and each of the lines may have two or more breakpoints at which a direction of the line changes.

Each one of the convexities may share some of the concavities with ones of the convexities that are adjacent to the one convexity, and either one or both of a shape and an area of each of the convexities that are adjacent to the one convexity may be different from either one or both of a shape and an area of the one convexity.

The convexities that are adjacent to the one convexity may be three to eight convexities.

The surface embossing pattern formed on at least a portion of the one side of the film may be a first surface embossing pattern, the film may further include a second surface embossing pattern formed on a least a portion of another side of the film, the second surface embossing pattern may include convexities and concavities separating the convexities of the second surface embossing pattern from one another, and shapes of the convexities in a unit area of 1 cm$^2$ of the first surface embossing pattern may be different from shapes of the convexities in a unit area of 1 cm$^2$ of the second surface embossing pattern.

The one side of the film may include a concavity A, a concavity B, and a concavity C in a unit area of 1 cm$^2$, the concavity B may adjacent to the concavity A, the concavity C may be adjacent to the concavity B, and a distance between the concavity A and the concavity B may be different from a distance between the concavity B and the concavity C.

There may be 24 to 9,800 convexities in a unit area of 1 cm$^2$ of the first surface embossing pattern, and a standard deviation of areas of the convexities in the unit area of 1 cm$^2$ of the first surface embossing pattern may be 0.01 to 0.4.

Each of the convexities may have a shape of a polygon including vertexes, and an internal angle of each of the vertexes of the polygon may be more than 40° and less than 180°.

The internal angles of all of the vertexes of the polygon may be different from each other.

The internal angles of two or more of the vertexes of the polygon may be equal to each other, and the internal angles of remaining ones of the vertexes of the polygon may be different from each other.

A value of deaeration performance of the film at 40° C. may be 80% or more of a value of deaeration performance of the film at 20° C.

Each of the convexities may have a shape of a polygon, and the polygon may be any one of a triangle, a quadrilateral, a pentagon, a hexagon, a heptagon, and an octagon.

The concavities may intersect with each other to form a line that begins at a start point where one of the concavities intersects a first edge of the surface embossing pattern, and extends along intersecting ones of the concavities to an end point where another one of the concavities intersects the first edge of the surface embossing pattern or a second edge of the surface embossing pattern.

80% or more of the convexities in a unit area of 1 cm$^2$ of the surface embossing pattern may have an area satisfying the equation $0.4 \times Sm \leq Sni \leq 1.6 \times Sm$, where $Sni$ is an area of a convexity in the unit area of 1 cm², and Sm is an average area of the convexities in the unit area of 1 cm².

The surface embossing pattern formed on at least a portion of the one side of the film may be a first surface embossing pattern, the film for laminated glass may further include a second surface embossing pattern formed on at least a portion of another side of the film opposite to the one side of the film, the second surface embossing pattern may include convexities, and concavities separating the convexities of the second surface embossing pattern from one another; the concavities of the first surface embossing pattern may include a first concavity and a third concavity, the concavities of the second surface embossing pattern may include a second concavity and a fourth concavity, the first concavity, the second concavity, the third concavity, and the fourth concavity may be disposed in a unit area of 1 cm² of the film when the film is viewed in a direction perpendicular to the one side of the film and the other side of the film, the first concavity and the second concavity may be adjacent to each other and a distance between the first concavity and the second concavity may be d1 when the film is viewed in the direction perpendicular to the one side of the film and the other side of the film, the third concavity and the fourth concavity may be adjacent to each other and a distance between the third concavity and the fourth concavity may be d2 when the film is viewed in the direction perpendicular to the one side of the film and the other side of the film, and d1 and d2 may be different from each other.

In another general aspect, a method of manufacturing a film for laminated glass includes preparing an untreated film, a first embossing pattern transfer device including a first pattern, and a second embossing pattern transfer device including a second pattern; and transferring the first pattern of the first embossing pattern transfer device to one side of the untreated film, and transferring the second pattern of the second embossing pattern transfer device to another side of the untreated film opposite the one side of the untreated film, thereby preparing a film for laminated glass, wherein the first pattern of the first embossing pattern transfer device includes first non-protrusions, and first protrusions separating the first non-protrusions from one another and being connected to each other so that each of the first non-protrusions is surrounded by some of the first protrusions, the second pattern of the second embossing pattern transfer device includes second non-protrusions, and second protrusions separating the second non-protrusions from each other and being connected to each other so that each of the second non-protrusions is surrounded by some of the second protrusions, one side of the film for laminated glass includes a first surface embossing pattern, another side of the film for laminated glass opposite the one side of the film for laminated glass includes a second surface embossing pattern, the first surface embossing pattern includes first convexities corresponding to the first non-protrusions of the first pattern of the first embossing pattern transfer device; and first concavities corresponding to the first protrusions of the first pattern of the first embossing pattern transfer device, the first concavities separating the first convexities from each other and being connected to each other so that each of the first convexities is surrounded by some of the first concavities, the second surface embossing pattern includes second convexities corresponding to the second non-protrusions of the second pattern of the second embossing pattern transfer device; and second concavities corresponding to the second protrusions of the second pattern of the second embossing pattern transfer device, the second concavities separating the second convexities from each other and being connected to each other so that each of the second convexities is surrounded by some of the second concavities, an average area of the first convexities is 0.01 mm² to 4.00 mm², and an average area of the second convexities is 0.01 mm² to 4.00 mm².

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
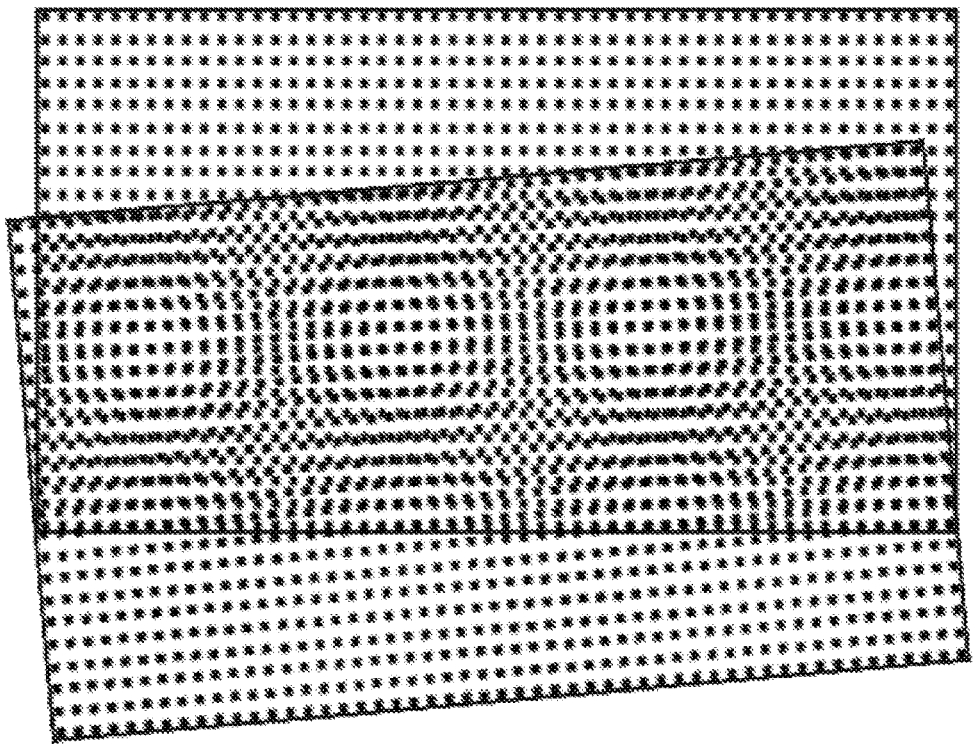
FIGS. 1A and 1B illustrate examples of conventional surface patterns of a film for laminated glass.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the present specification, terms of degree such as "about" and "substantially" are used to mean values approximately equal to a value when a tolerance to be proper to referred meaning for manufacture and substance is presented. Additionally, these terms of degree are used to help understanding of examples and to cover examples that differ insignificantly from an exact or absolute number.

In the present specification, the term "combination of" included in a Markush expression means mixtures or combinations of one or more components described in Markush expression, and therefore means including one or more elements selected from the group consisting of the component.

In the present specification, the expression "A and/or B" means either one or both of A and B.

In the present specification, terms such as "first" and "second" or "A" and "B" are used to distinguish one element from another element, unless specifically stated otherwise.

In the present specification, it will be understood that when "B" is referred to as being on "A", "B" can be directly on "A" or intervening other component(s) may be present therebetween. That is, the location of "B" is not construed as being limited to direct contact of "B" with the surface of "A".

In the present specification, the singular forms "a", "an," and "the" are intended to include the plural forms as well, unless the context clearly dictates otherwise.

In the present specification, the term "polygon" refers to a two-dimensional figure having three or more sides, and includes a triangle, a quadrilateral, a pentagon, a hexagon, a heptagon, an octagon, and so on, but is not limited thereto. Additionally, polygons including one or more curves in some or the whole thereof like a circle and an ellipse that have infinite sides are also included.

Figure 1B:
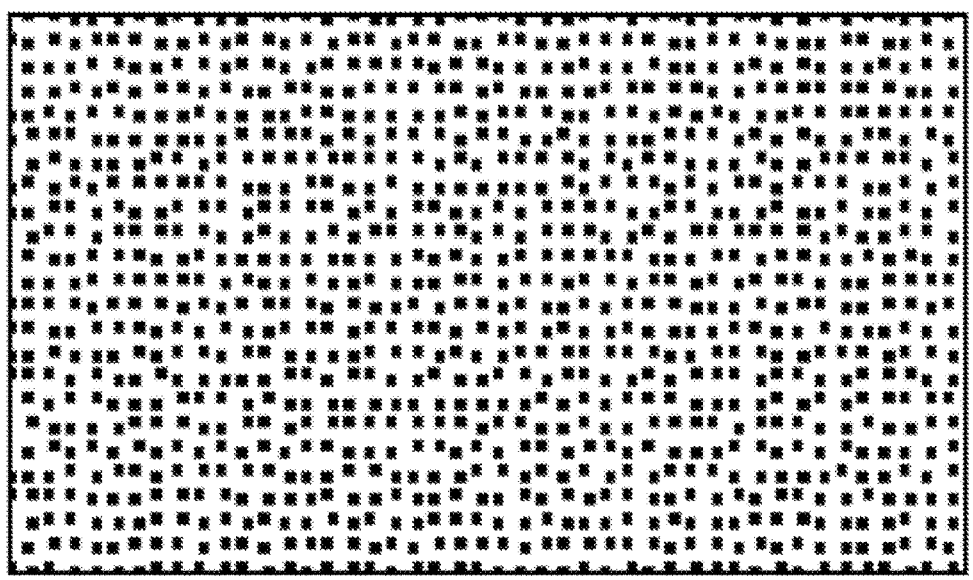

FIGS. 1A and 1B illustrate examples of conventional surface patterns of a film for laminated glass.

The inventors conducted research to address the problems that are when a specific pattern is formed in one side and the other side of the film, an optical interference phenomenon occurs so that optical properties of a film for laminated glass are degraded (refer to FIG. 1A, moire phenomenon), and if a method of allowing irregular dots to be located in one side and the other side of the film is applied to avoid this phenomenon (refer to FIG. 1B), deaeration performance may be degraded. As a result, the inventors verified that when an embossing pattern that has convexities in substantial polygon shapes and has a form in which concave lines between such convexities are connected to each other is applied by utilizing an atypical linear pattern, all the conflicting properties required in a film for laminated glass having an embossing pattern, like an optical interference phenomenon and deaeration performance, are met at the same time. Examples the inventors developed in their research are described below.

Figure 2A:
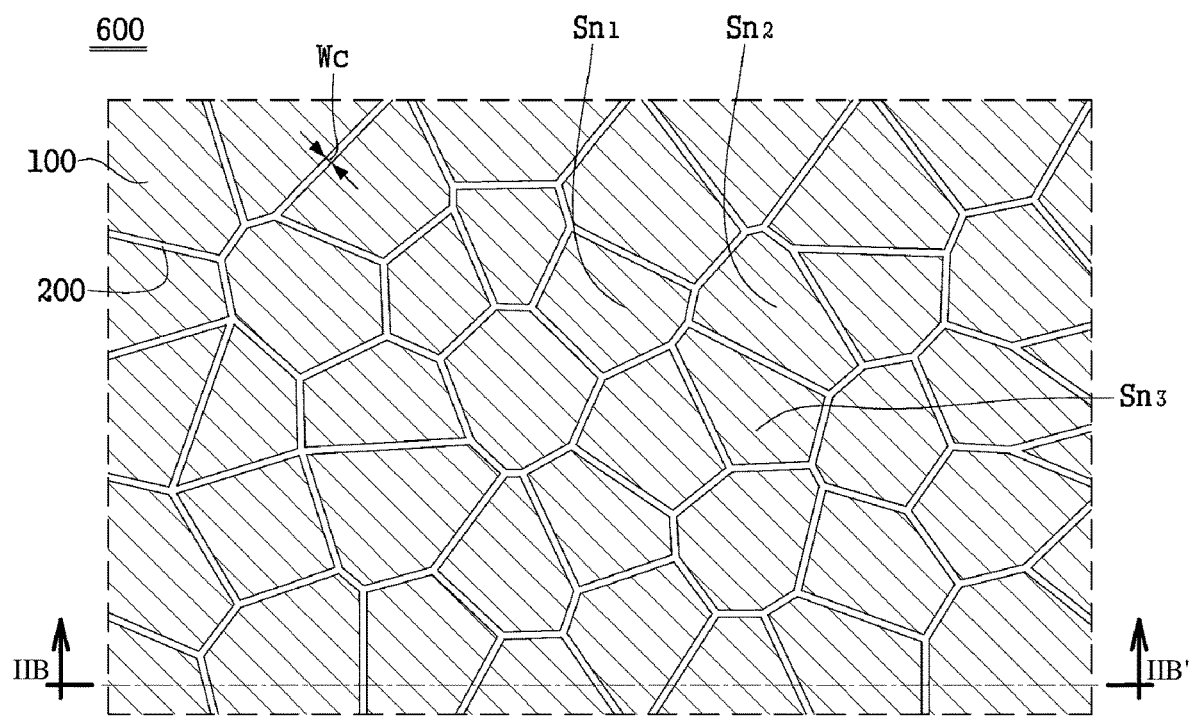
FIG. 2A shows an example of a surface pattern of a film for laminated glass according to this application.
Figure 2B:
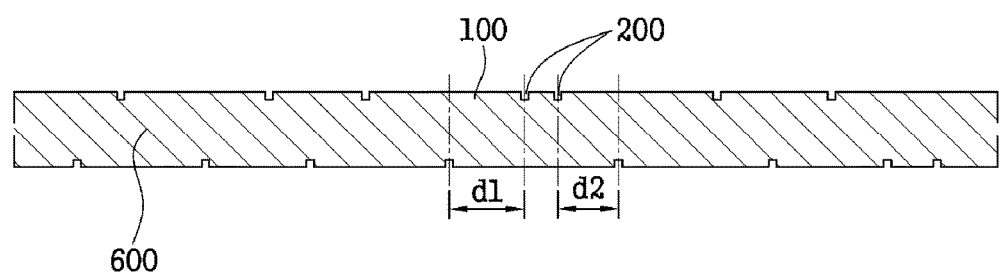
FIG. 2B is a cross-sectional view taken along the line IIB-IIB' in FIG. 2A.
Figure 3:
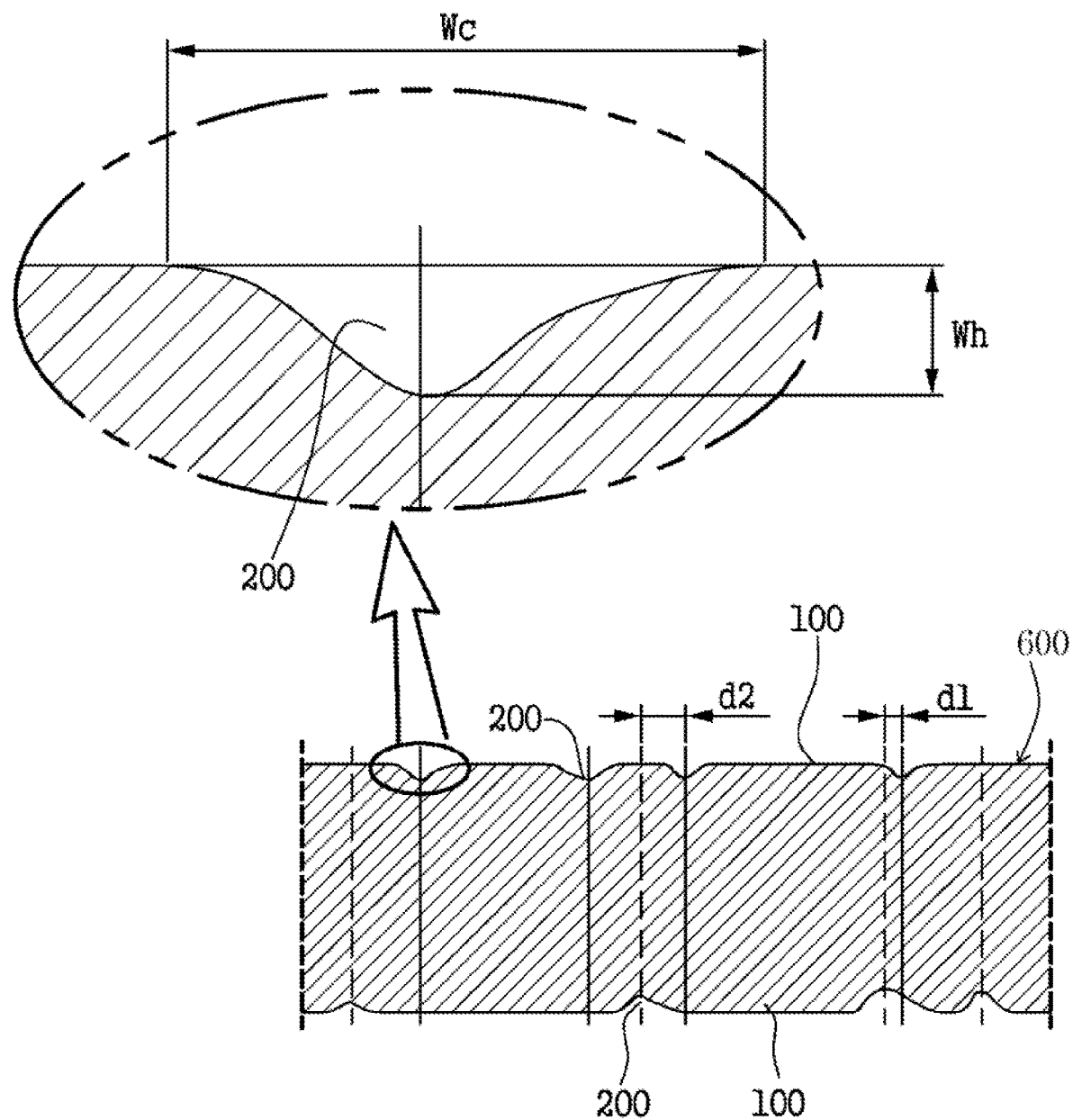
FIG. 3 is a cross-section of an example of a film for laminated glass.
Figure 4:
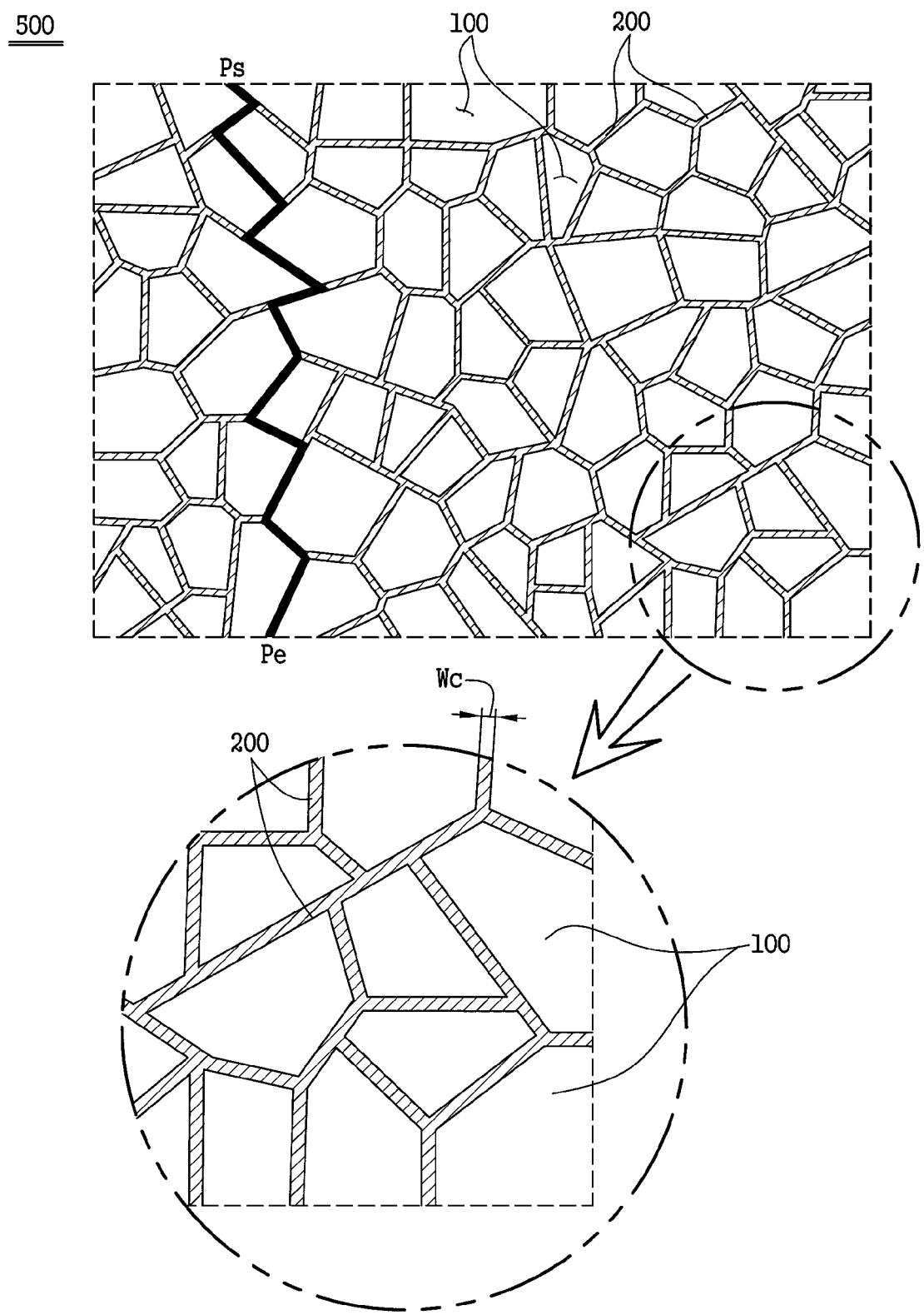
FIG. 4 shows an example of a surface embossing pattern of a film for laminated glass.
Figure 5:
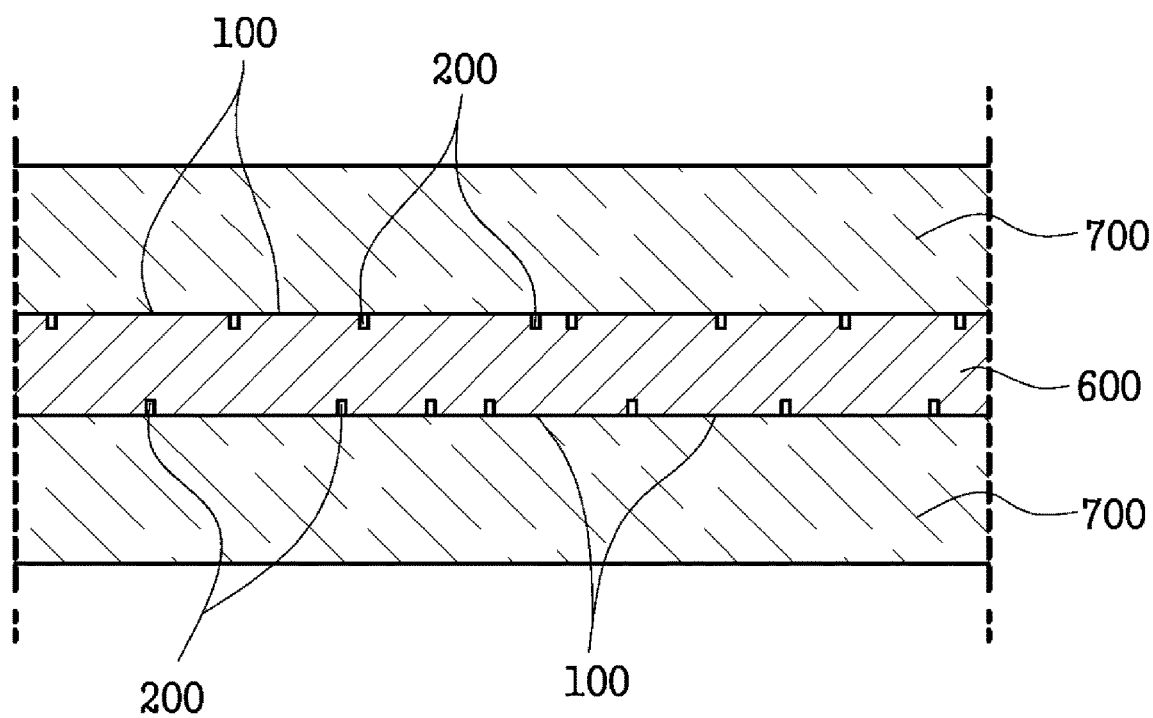
FIG. 5 is a cross-sectional view of an example of a film for laminated glass disposed between two pieces of glass and pre-laminated.

FIG. 2A shows an example of a surface pattern of a film for laminated glass according to this application, and FIG. 2B is a cross-sectional view taken along the line IIB-IIB' in FIG. 2A. FIG. 3 is a cross-sectional view of an example of a film for laminated glass. FIG. 4 shows an example of a surface embossing pattern of a film for laminated glass. FIG. 5 is a cross-sectional view of an example of a film for laminated glass disposed between two pieces of glass and pre-laminated. Referring to FIGS. 2A to 5, a detailed description will be provided below.

A film for laminated glass 600 includes a surface embossing pattern 500 formed on at least a portion of one side of the film for laminated glass 600. The surface embossing pattern 500 includes convexities 100, and concavities 200 separating the convexities 100 from one another.

Each one of the convexities 100 is surrounded by some of the concavities 200.

Each one of the convexities 100 shares some of the concavities 200 with ones of the convexities 100 that are adjacent to the one convexity 100.

A line in which the one convexity 100 and the shared concavities 200 meet forms a simple closed curve.

A line connecting parts in which the one convexity 100 and the shared concavities 200 meet may have a shape of a polygon.

The polygon may be a triangle, a quadrilateral, a pentagon, a hexagon, a heptagon, an octagon, and so on, but is not limited thereto, and these shapes may be mingled. The term "polygon" refers to a two-dimensional figure having substantially a polygon shape, and forms the embossing pattern by pressing a embossing forming transfer device like a plate (or a roller) on the film, so that a line in which the shared concavities 200 and the one convexity 100 meet is not necessarily straight, and may include a part that looks like a curve.

The convexities do not include rectangles, and the convexities do not include squares.

The convexities may intersect to form a line having a shape of a polygon, and the line may two or more breakpoints at which a direction of the line changes. Whether the line has two or more breakpoints is evaluated based on the surface embossing pattern on one side.

An internal angle of each vertex of the polygon may be 40° or more, and less than 180°. Alternatively, the internal angle of each vertex of the polygon may be 45° to 160°. The internal angles of all of the vertexes of the polygon may be different from each other. Alternatively, the internal angles of two or more of the vertexes of the polygon may be equal to each other.

The internal angle of a vertex of the polygon is an angle from one point in which a line connecting convexities 100 adjacent to each other and a concavity 200 meets.

The convexities do not include polygons having two opposite vertexes each having an internal angle of 90°. When two opposite vertexes of the polygon each have an internal angle of 90°, a breakpoint of a line formed by concavities may be not generated substantially, and this forms an ordered pattern of concavities so that the effect of reducing the optical distortion may be slight.

Each one of the convexities 100 shares some of the concavities 200 with three to eight of the convexities 100 that are adjacent to the one convexity 100. Either one or both of a shape and an area of each of the three to eight convexities 100 that are adjacent to the one convexity 100 may be different from either one or both of a shape and an area of the one convexity 100.

When the one convexity and the convexities adjacent to the one convexity having the above characteristics are applied to the film for laminated glass, an embossing pattern having an irregular shape in which the sizes of the polygons are within a certain range but are not the same is formed, and superior optical properties and deaeration performance may be obtained.

The convexities 100 may have an average area of 0.01 mm$^2$ to 4.00 mm$^2$.

The average area is based on the area of convexities evaluated based on a unit area (1 cm$^2$) of a surface embossing pattern 500 of the film for laminated glass 600.

The surface embossing pattern 500 may be a small-area type in which the average area of the convexities 100 is 0.1 mm$^2$ to 0.5 mm$^2$, or a medium-area type in which the average area of the convexities 100 is more than 0.5 mm$^2$ and less than or equal to 0.9 mm$^2$, or a large-area type in which the average area of the convexities 100 is more than 0.9 mm² and less than or equal to 1.5 mm², or a super-large-area type in which the average area of the convexities 100 is more than 1.5 mm² and less than or equal to 4.00 mm².

The surface embossing pattern 500 may include the convexities 100 in an amount of 24 to 9,800 per unit area (1 cm²).

A standard deviation of the areas of the convexities in the unit area (1 cm²) may be 0.01 to 0.4, or 0.05 to 0.35.

When the convexities 100 are the low-area type, the standard deviation of the areas of the convexities 100 may be 0.01 to 0.1. When the convexities 100 are the medium-area type, the standard deviation of the areas of the convexities 100 may be 0.1 to 0.2. When the convexities 100 are the large-area type or the super-large-area type, the standard deviation of the areas of the convexities 100 may be 0.2 to 0.3.

When the standard deviation of the areas of the convexities 100 has such a range, the convexities 100 have an irregular pattern in the surface embossing pattern 500 overall, and include convexities 100 having a comparatively regular size, but the convexities 100 are distributed comparatively evenly.

A difference between a height of the convexities 100 and a height of the concavities 200 may be 80 μm or less.

Alternatively, the difference between the height of the convexities 100 and the height of the concavities 200 may be 70 μm or less, or 60 μm or less, or 3 to 55 μm, or 5 to 45 μm.

In this case, the difference between the height of the convexities and the height of the concavities is sufficient so that even after a pre-lamination process of bonding the film for laminated glass 600 to two pieces of glass has been performed, are least some of the concavities 200 of the surface embossing pattern of the film for laminated glass 600 are maintained and do not disappear, so that sufficient deaeration performance can be obtained.

A width (Wc) of the concavities 200 may be 2 to 120 μm.

A shape of a cross-section of the concavities 200 may be a quadrilateral, a semicircle, an inverted triangle, or a lozenge, but is not limited thereto as long as it is concave.

The width (Wc) of the concavities 200 is a width of the concavities 200 measured along a virtual line extending between the convexities 100.

The concavities 200 function as passages for air in a lamination process, and since at least some of the concavities 200 are maintained and do not disappear even after the pre-lamination process has been performed, some of the concavities are maintained, thereby giving excellent deaeration performance (refer to FIG. 5).

In addition, the concavities 200 are formed to have a value in a certain range overall, but do not have a regular pattern, thereby manufacturing a film for laminated glass having excellent optical properties.

A surface roughness (Rz) of the surface embossing pattern 500 may be 30 to 70 μm, or 30 to 60 μm, or 32 to 50 μm, or 35 to 45 μm. When the surface embossing pattern has a surface roughness (Rz) in such a range, excellent deaeration performance and sufficient edge sealing effects can be obtained.

The surface roughness (Rz) is measured by the method of DIN EN 4287:2010-7.

The film for laminated glass 600 includes another surface embossing pattern 500 formed on at least a portion of the other side of the film for laminated glass 600. The other surface embossing pattern 500 includes convexities 100, and concavities 200 separating the convexities 100 from one another.

The shapes of the convexities 200 in a unit area (1 cm²) of the one side of the film for laminated glass 600 are different from the shapes of the convexities 200 in a unit area (1 cm²) of the other side of the film for laminated glass 600 to substantially prevent an optical distortion phenomenon.

The film for laminated glass 600 has excellent optical properties because the convexities 100 of the one side and the convexities 100 of the other side have different shapes and do not form regular patterns so as not to generate diffraction interference fringes.

The film for laminated glass 600 may have a haze value of 10% or less, or 5% or less.

The film for laminated glass 600 has excellent deaeration performance due to the concavities 200 that separate the convexities 100 to one another and are connected to each other directly or indirectly, and simultaneously has excellent edge sealing performance.

The film for laminated glass 600 formed in this manner may be laminated between two pieces of glass 700 to form a laminated glass 900. The laminated glass 900 may be manufactured by applying a pre-lamination process and a main lamination process sequentially or simultaneously.

Particularly, in a pre-lamination process of a film for laminated glass 600 disposed between the two pieces of glass 700, air in the space between two pieces of glass and the film may passing through the concavities 200 within a surface embossing pattern to be eliminated, and diffraction interference fringes may not occur or may be slight because the surface embossing pattern is irregular.

A film for laminated glass 600 includes a surface embossing pattern 500 formed on at least a portion of one side of the film for laminated glass 600. The surface embossing pattern 500 includes convexities 100, and concavities 200 separating the convexities 100 from one another.

The convexities 100 in the unit area (1 cm²) may be different in shape or area.

Among the convexities 100 in the unit area (1 cm²) of the surface embossing pattern 500, 80% or more of the convexities may have an area satisfying Equation 1 below.

$$0.4 \times Sm \leq Sni \leq 1.6 \times Sm \quad (1)$$

In Equation 1, Sni is an area of a convexity, and Sm is an average area of convexities in the unit area in which the convexities are located.

Alternatively, among the convexities 100 in a unit area (1 cm²) of the surface embossing pattern, 90% or more of the convexities may satisfy Equation 1.

The convexities may include three or more convexities different in shape and/or size from each other. When three or more convexities different in shape and/or size are included in the surface embossing pattern, concavities or convexities may not have a regular repetitive pattern, and even if surface embossing patterns are formed on both sides of the film for laminated glass 600, occurrence of an optical distortion phenomenon can be substantially prevented.

The film for laminated glass 600 has a surface embossing pattern 500 in which the convexities 100 different in shape and/or area are located and are separated from each other by the concavities 200. Although the overall size of these convexities is maintained in a certain range, the convexities simultaneously have an irregular shape overall, so that the film for laminated glass 600 does not generate diffraction interference fringes and can have excellent deaeration performance simultaneously, even when the surface embossing patterns 500 are formed on both sides of the film for laminated glass 600.

A line started from any point (a start point Ps) at which an edge of the surface embossing pattern 500 and one of the concavities 200 meet and drawn along the concavities 200 may continue to a point (an end point Pe) at which an edge of the surface embossing pattern 500 and one of the concavities 200 meet that is the same as or different from the start point Ps. The line drawn along the concavities 200 in this manner allows deaeration to proceed smoothly.

A line continuing from the start point (Ps) to the end point (Pe) has two or more breakpoints. Such a breakpoint may be a point in which two, three, or more concavities with different directions of center lines thereof meet each other. The line continuing from the start point to the end point has two or more multiple breakpoints in which various center lines meet like this, and these lines are connected to each other, thereby forming a pattern in a net shape of concavities 200.

The pattern in a net shape of concavities has a form in which lines having multiple breakpoints intersect, and does not have a form in which straight lines intersect in plaid patterns or check patterns. That is, concavities of examples of a surface embossing pattern applied in according to this application are different from plaid patterns or check patterns, and such breakpoints help an irregular pattern to be formed, thereby substantially preventing an optical distortion phenomenon caused by a regular pattern from occurring.

In addition, a shape of a pattern of concavities in a unit area (1 cm$^2$) of the surface embossing pattern may be different from a shape of a pattern of concavities in another unit area (1 cm$^2$) adjacent to unit area (1 cm$^2$). Because patterns of concavities adjacent to each other are formed with an irregular pattern, and do not have a regular pattern, the surface embossing pattern does not generate an optical distortion phenomenon, even though surface embossing patterns are formed on both sides of the film for laminated glass.

One side of the film for laminated glass 600 includes a first surface embossing pattern 500 including convexities 100 and concavities 200 separating the convexities 100 from one another and the other side of the film for laminated glass 600 includes a second surface embossing pattern 500 including convexities 100 and concavities 200 the convexities 100 from each other.

A value of the distance (d1) between a first concavity of the first surface embossing pattern 500 inside a unit area (1 cm$^2$) of the film and a second concavity of the second surface embossing pattern close to the first concavities is different from a value of the distance (d2) between a third concavity of the first surface embossing pattern and a fourth concavity of the second surface embossing pattern close to the third concavity (refer to FIGS. 2A, 2B, and 3). When the d1 value and the d2 value are different from each other, optical distortion caused by an interference phenomenon substantially does not occur, and a film for laminated glass having excellent optical properties with an embossing pattern can be provided.

Specifically, d1 and d2 respectively may have a value of 2.5 mm or less, or a value of 0.002 to 2.2 mm. When having d1 and d2 have values in the above range, an embossing pattern satisfying deaeration performance and sealing performance simultaneously can be formed.

An average depth (Wh) of the concavities 200 of the first surface embossing pattern 500 may be 10% or less, or 9% or less, or 6% or less, with respect to a total thickness of the film. Alternatively, the average depth of the concavities may be 0.2% to 6%, or 0.5% to 4%, with respect to a total thickness of the film.

When the concavities 200 are formed with such a depth, the concavities having excellent deaeration performance can be formed. But when the average depth of the concavities is too great, bubbles may be generated at edges, or an embossing pattern may partially remain after a process of main lamination because the embossing pattern does not disappear depending on the condition of lamination in the process of main lamination. Therefore, the concavities should be formed with a depth in the above range.

For example, the average depth (Wh) of the concavities may be 80 μm or less, or 70 μm or less, or 60 μm or less. Alternatively, the average depth (Wh) of the concavities may be 3 to 55 μm, or 5 to 45 μm.

The depth (Wh) of the concavities is to a distance from a virtual line extending between the convexities 100 to the lowest portion of the concavities.

In this case, due to a sufficient depth, a surface embossing pattern is maintained without completely disappearing during pre-lamination and can have sufficient deaeration performance.

The concavities may have an average width of 2 to 120 μm, or 10 to 70 μm. The width (Wc) of the concavities is a width of the concavities measured along a virtual line extending between the convexities 100.

A value of the distance between a concavity A in a unit area (1 cm$^2$) of one side of the film for laminated glass 600 and a concavity B adjacent to the concavity A in the unit area (1 cm$^2$) of the one side may be different from a value of the distance between the concavity B in the unit area (1 cm$^2$) of the one side and a concavity C adjacent to the concavity B in the unit area (1 cm$^2$) of the one side.

Additionally, a value of the distance between a concavity A in a unit area (1 cm$^2$) of the other side of the film for laminated glass 600 and a concavity B adjacent to the concavity A in the unit area (1 cm$^2$) of the other side may be different from a value of the distance between the concavity B in the unit area (1 cm$^2$) of the other side and a concavity C adjacent to the concavity B in the unit area (1 cm$^2$) of the other side.

The shape of a cross-section of the concavities 200 may be usually a quadrilateral, a semicircle, an inverted triangle, or a lozenge, but is not limited thereto as long as it is concave.

The shape of the cross-section of the concavities of the first surface embossing pattern in a unit area (1 cm$^2$) of the film and the shape of the cross-section of the concavities of the second embossing pattern in a unit area (1 cm$^2$) of the film may be different from each other.

The concavities 200 function as a passages for air in a lamination process, and since at least some of the concavities 200 are maintained and do not disappear even after the pre-lamination process has been performed, some of the concavities are maintained, thereby giving excellent deaeration performance.

In addition, the concavities 200 are formed to have a value in a certain range overall, but do not have a regular pattern, and thereby manufacturing a film for laminated glass having excellent optical properties.

The evaluated value of deaeration performance at 40° C. of the film for laminated glass is maintained at 80% or more, or 85% or more, or 90% or more, of the evaluated value of deaeration performance at 20° C. of the film for laminated glass. In this case, a surface embossing pattern is not easily collapsed despite an increase in temperature during a lamination process, so that a film for laminated glass in which occurrence of defects like bubbles is remarkably lowered can be provided.

The film for laminated glass 500 may have an evaluated value of deaeration performance at 20° C. of 43 to 72 cm Hg, or 55 to 72 cm Hg, or 63 to 71 cm Hg.

The film for laminated glass 500 may have an evaluated value of deaeration performance at 30° C. of 33 to 72 cm Hg, or 60 to 71 cm Hg.

The film for laminated glass 500 may have an evaluated value of deaeration performance at 40° C. of 28 to 72 cm Hg, or 55 to 69 cm Hg.

When the film for laminated glass 500 having an evaluated value of deaeration performance in these ranges is applied, deaeration is possible even at a comparatively high temperature during lamination so that the film can have excellent deaeration performance.

As for the evaluated value of deaeration performance, a value from the result of a vacuum ring test is applied. For example, a sample of a film for laminated glass having a diameter of 320 mm is prepared and placed between a pair of glass plates in a circle shape, thereby preparing a laminate, and after that a vacuum ring apparatus is installed and applies a vacuum to the laminate. The degree of vacuum was measured with a pressure gauge after 30 seconds at each temperature so that the deaeration performance can be measured.

The film for laminated glass 500 may have a bubble occurrence number at the edge of 30 or less, or 15 or less. That is, the film for laminated glass has excellent edge sealing effects.

The bubble occurrence number is one index for evaluating edge sealing performance, and the bubble occurrence number within 5 mm from the edge is evaluated with the number irrespectively to the area in a test sample (based on the edge length of 12 m).

Hereinafter, the composition of a film for laminated glass will be described.

The film for laminated glass includes a first layer having light transmitting performance, and the first layer may be a polyvinyl acetal layer, an ionomer layer, a polyethylene terephthalate layer, or a polyimide layer.

The film for laminated glass may include a polyvinyl acetal resin and a plasticizer, for example, may include a polyvinyl acetal in an amount of 60 to 76 wt %, or 70 to 76 wt %. In this case, a comparatively high tensile strength and modulus of elasticity can be given to the polyvinyl acetal layer.

The polyvinyl acetal resin may have an acetyl group in an amount of less than 2 mol %, or in an amount of 0.01 to 2 mol %. The polyvinyl acetal resin may have a hydroxyl group in an amount of 30 mol % or more, or in an amount of 30 to 50 mol %.

The polyvinyl acetal resin may be a polyvinyl acetal resin obtained from acetalization of a polyvinyl alcohol having a polymerization degree of 1,600 to 3,000 with an aldehyde, or may be a polyvinyl acetal resin obtained from acetalization of a polyvinyl alcohol having a polymerization degree of 1,700 to 2,500 with an aldehyde. When such a polyvinyl acetal resin is used, mechanical properties like penetration resistance may be enhanced sufficiently.

The polyvinyl acetal resin may be one in which a polyvinyl alcohol and an aldehyde are synthesized, and a type of the aldehyde is not limited. For example, the aldehyde may be one selected from the group consisting of n-butyl aldehyde, isobutyl aldehyde, n-valer aldehyde, 2-ethyl butyl aldehyde, n-hexyl aldehyde, and blends thereof. When n-butyl aldehyde is used as the aldehyde, a manufactured polyvinyl acetal resin may have a characteristic in refractive index of which the difference with refractive index of glass is small, and a characteristic in excellent adhesion with glass.

The polyvinyl acetal layer may include the plasticizer in an amount of 24 to 40 wt %, or 24 to 30 wt %. When including the plasticizer in this range, a film for laminated glass can have suitable adhesion and penetration resistance.

As the plasticizer, any one selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and combinations thereof may be applied. Specifically, the plasticizer may include any one selected from the group consisting of triethylene glycol di-2-ethyl butyrate, triethylene glycol di-2-ethylhexanoate, triethylene glycol di-n-heptanoate, and combinations thereof, and further specifically, triethylene glycol vis-2-ethylhexanoate (3G8) may be applied as the plasticizer.

The polyvinyl acetal resin layer may have a characteristic that is a glass transition temperature of 15 to 25° C. measured by the method of differential scanning calorimetry, and specifically may have a characteristic that is a glass transition temperature of 17 to 20° C. In these cases, the polyvinyl acetal resin layer may exhibit an excellent sound insulating characteristic at room temperature.

The ionomer is a copolymer including an olefin-based repeating unit and a carboxyl acid-based repeating unit, and in which an ionic compound containing a metal ion to acidic functional group may be applied.

Specifically, the ionomer may be an olefin-based ionomer, and further specifically, may be a copolymer of a repeating unit induced with alpha olefin having 2 to 4 carbon atoms and an alpha and beta ethylene-based unsaturated carboxyl acid repeating unit having 3 to 6 carbon atoms. The ionomer may be an ionic compound containing a metal ion to a side chain having the acidic functional group.

The ionomer may include the olefin-based repeating unit in an amount of 20 to 95 wt %, or 20 to 90 wt %, or 40 to 95 wt %, or 40 to 75 wt %. The ionomer may include the carboxyl acid-based repeating unit in an amount of 5 to 80 wt %, or 10 to 80 wt %, or 5 to 60 wt %, or 25 to 60 wt %.

As the metal ion, monovalent, divalent, or trivalent metal ions may be applied, for example, $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$, $Sc^{3+}$, $Fe^{3+}$, $Al^{3+}$ or $Yt^{3+}$ may be applied. Specifically, good results may be obtained if $Mg^{2+}$, $Na^+$, or $Zn^{2+}$ is applied as the metal ion.

The ionomer may be a copolymer of an ethylene-based repeating unit having 2 to 4 carbon atoms and an ethylenically unsaturated carboxyl acid repeating unit having 3 to 6 carbon atoms, and may be an ionic compound in which the acidic side chain is combinable with the metal ion.

The polyethylene terephthalate resin may have a crystallization degree of 0% to 80%, or 10% to 70%, or further specifically 40% to 60%. The polyethylene terephthalate resin may be a copolymerization resin, and the copolymerization polyethylene terephthalate may be one in which ethylene glycol and neopentyl glycol as glycol ingredients are copolymerized.

The polyimide resin is a resin manufactured by imidization after polyamic acid derivatives have been prepared by solution polymerization of aromatic dianhydride, and aromatic diamine or aromatic diisocyanate. Specifically, the polyimide resin may be one obtained by imidization of a polyamic acid resin synthesized from aromatic acid dianhydride including biphenyltetracarboxylic dianhydride and aromatic diamine including para-phenylene diamine, but the polyimide resin is not limited thereto.

The film for laminated glass 600 may have a structure in which the layers referred above are laminated to each other, for example, may have a three-layer structure of first layer-second layer-first layer.

For example, the second layer may be a sound insulating layer. When the sound insulating layer is a polyvinyl acetal resin layer, the layer may include the polyvinyl acetal resin in an amount of 54 to 76 wt %, or 60 to 70 wt %, and a plasticizer in an amount of 24 to 46 wt %, or 30 to 40 wt %.

The polyvinyl acetal resin of the sound insulating layer may have acetyl group in an amount of 8 mol % or more, and specifically, in an amount of 8 to 30 mol %. In addition, the polyvinyl acetal resin of the sound insulating layer may have a hydroxyl group of 18 mol % or less, or 6 to 15 wt %. In this case, a sound insulating performance of the film can be more enhanced.

Figure 6:
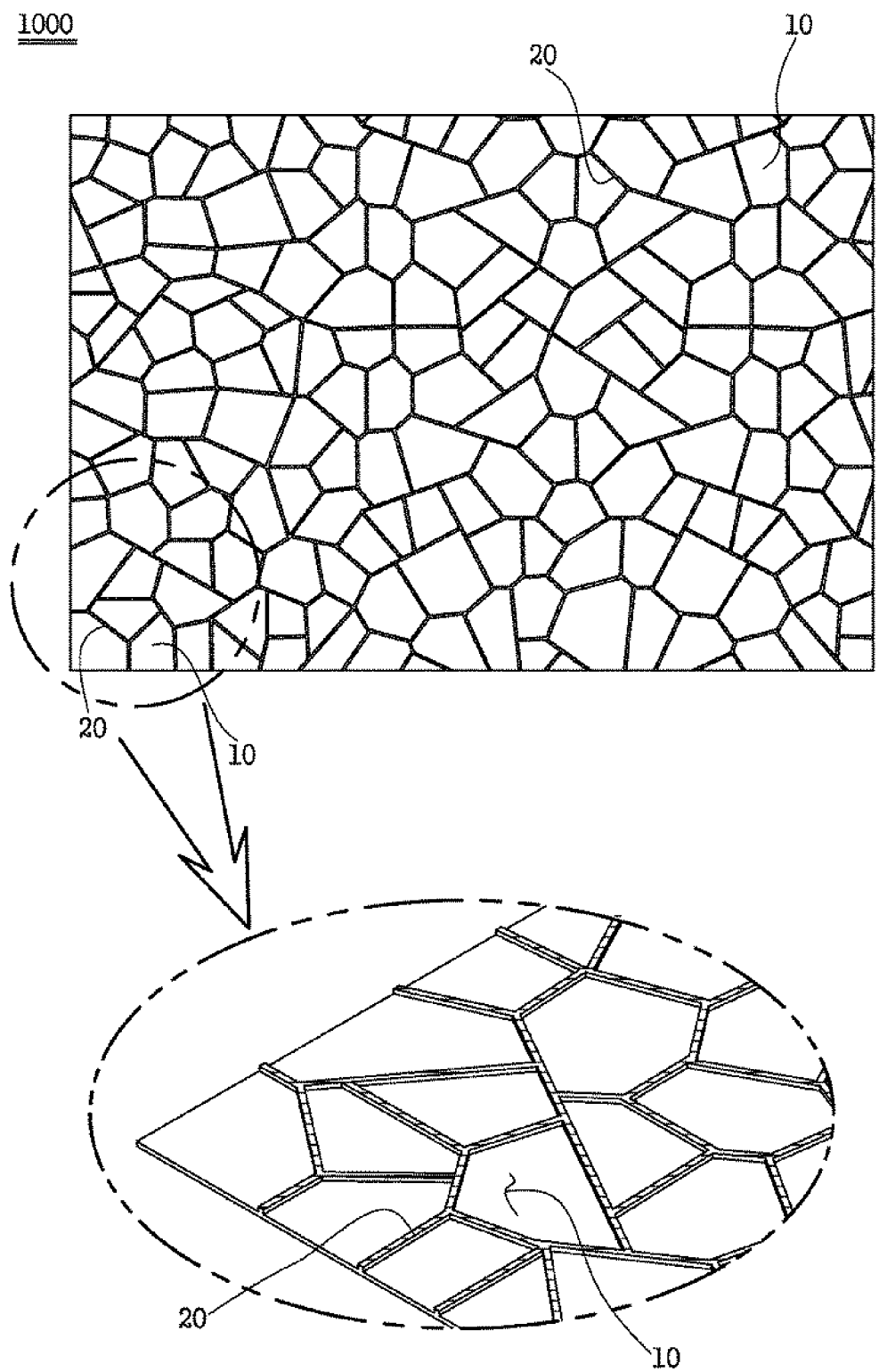
FIG. 6 shows an example of an embossing pattern of an embossing pattern transfer device.

FIG. 6 shows an example of an embossing pattern of an embossing pattern transfer device. Referring to FIG. 6, another example will be described below.

An example of a method of manufacturing a film for laminated glass 600 includes a preparation step of preparing an embossing pattern transfer device 1000 having an embossing pattern including non-protrusions 10, and protrusions 20 separating the non-protrusions 10 from each other and connected to each other, and an untreated film; and a transfer step of transferring the embossing pattern to the untreated film, thereby manufacturing a film for laminated glass 600 having a surface embossing pattern.

The non-protrusions 10 correspond to the convexities 100.

The protrusions 20 correspond to the concavities 200.

The surface embossing pattern include convexities 100, and concavities 200 separating the convexities 100 from one another.

At least a portion of at least one side of the surface embossing pattern 500 includes convexities 100, and concavities 200 separating the convexities 100 from one another.

Each one of the convexities 100 is surrounded by some of the concavities 200.

Before the transfer step, a film manufacture step of manufacturing a film for laminated glass using a polymer resin and a plasticizer as described above may be performed. Since the polymer resin and the plasticizer have already been described above, the description will not be repeated here for clarity and conciseness. In addition, the film manufacture step may further include general methods of manufacturing a film, for example, a co-extrusion method.

The embossing pattern transfer device 1000 may have a roll form or a plate form, but is not limited thereto.

The transfer may be carried out under a temperature condition of 30 to 150° C.

When the embossing pattern transfer device 1000 has a roll form, the transfer may be carried out under a linear pressure of 20 N/mm to 100 N/mm.

When transfer is performed under such a temperature range and such a pressure range, a film 600 having excellent deaeration performance and edge sealing performance can be manufactured.

Figure 7A:
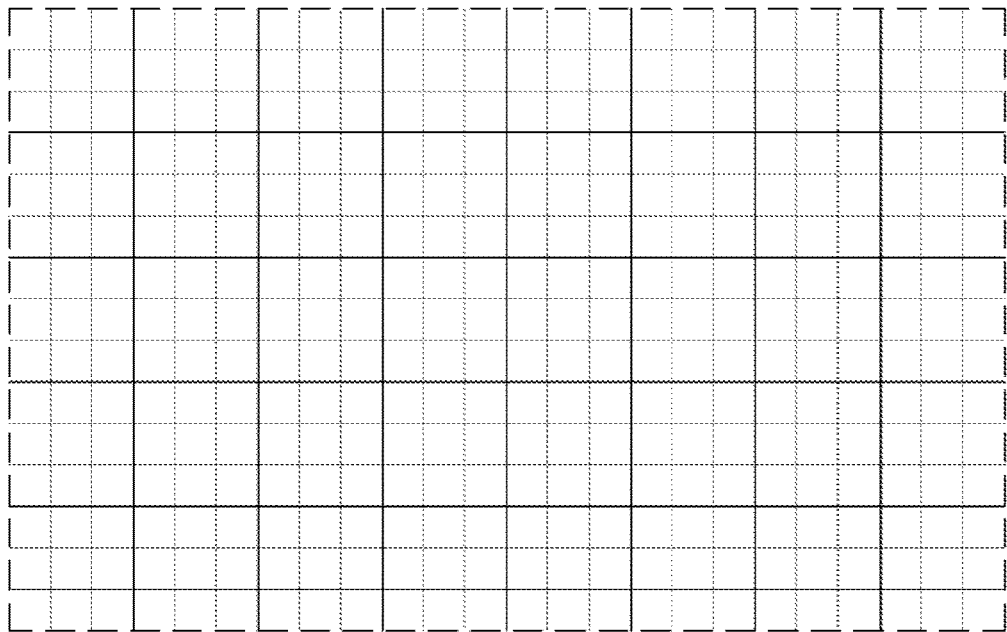
FIGS. 7A and 7B respectively show an example of a preparation step and an example of a dotting step of a method of manufacturing an embossing pattern of a film for laminated glass.
Figure 7B:
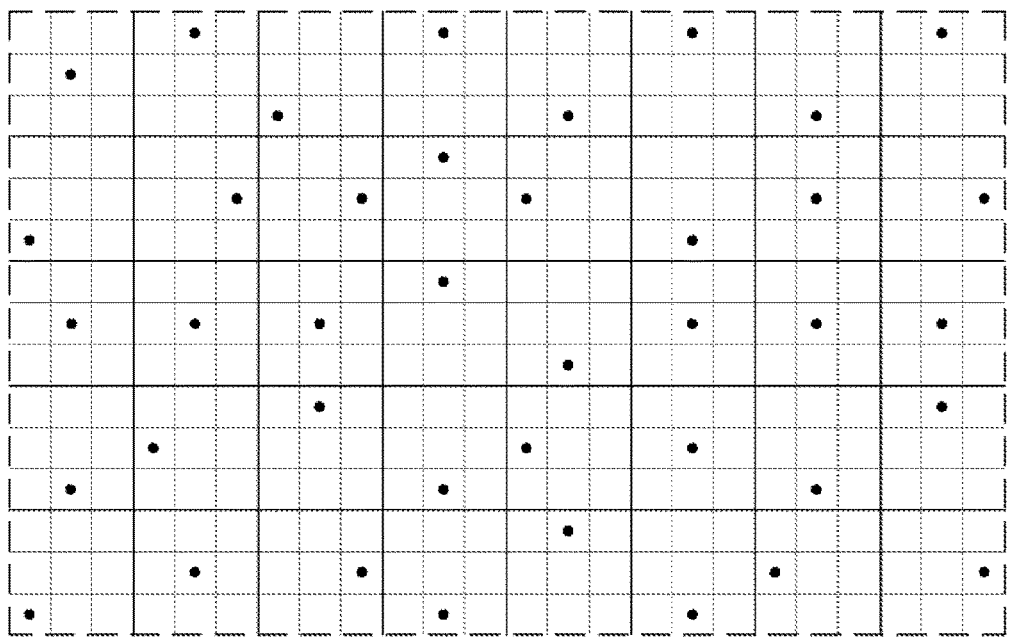
Figure 8A:
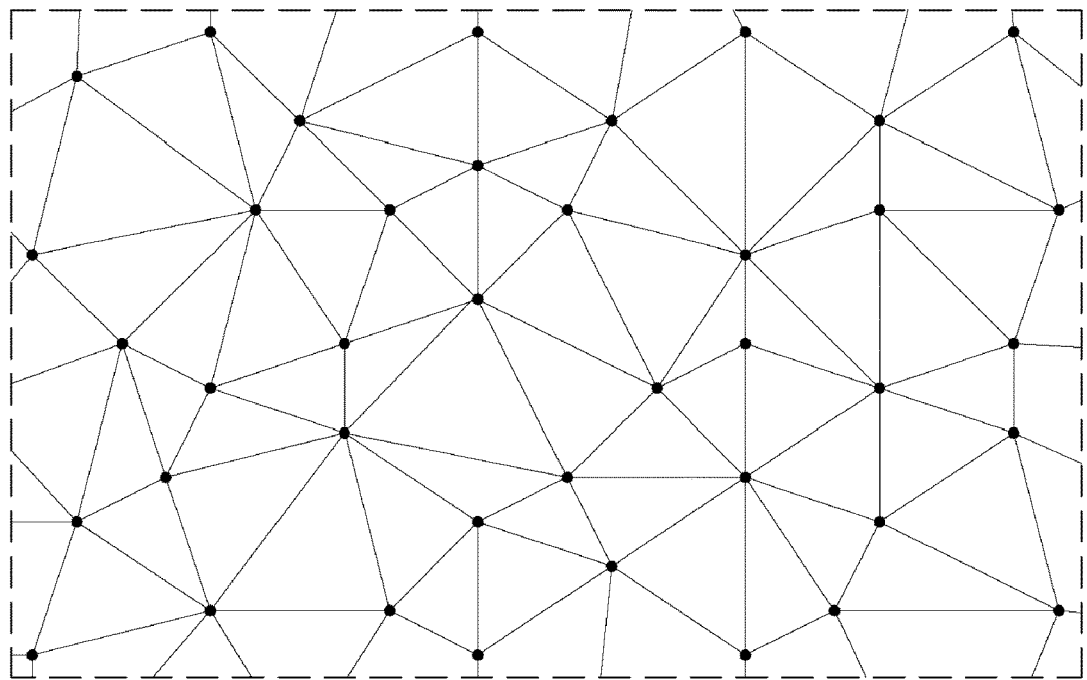
FIGS. 8A and 8B respectively show an example of a connection step and an example of a figure setting step of the method of manufacturing an embossing pattern of the film for laminated glass.
Figure 8B:
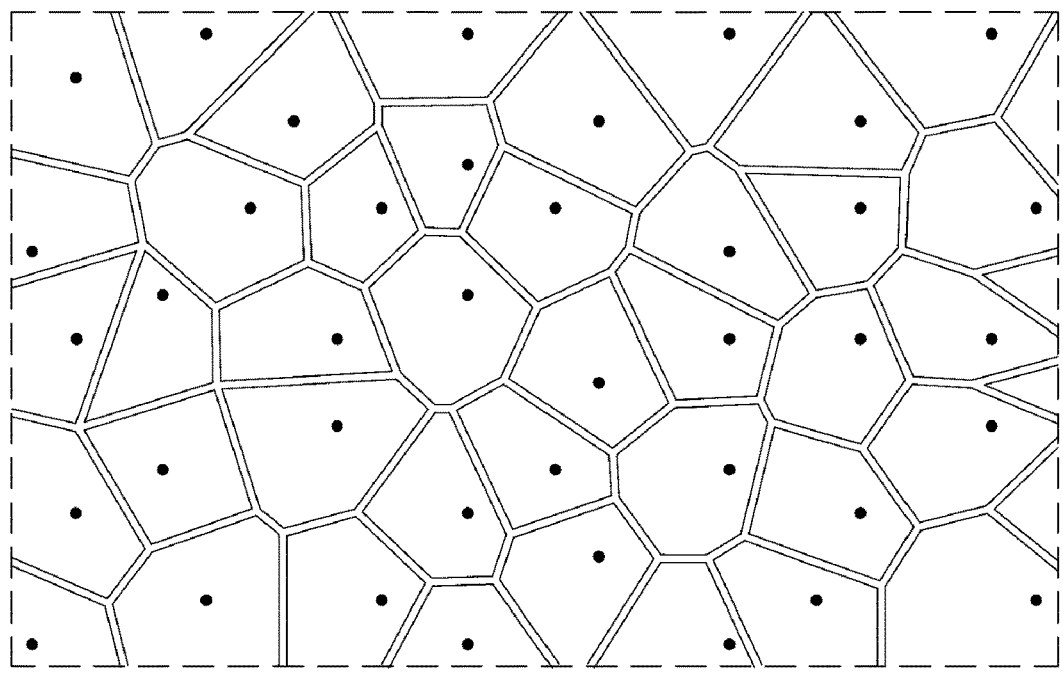

FIGS. 7A and 7B respectively show an example of a preparation step and an example of a dotting step of a method of manufacturing an embossing pattern of a film for laminated glass. FIGS. 8A and 8B respectively show an example of a connection step and a figure setting step of the method of manufacturing an embossing pattern of a film for laminated glass. adumbratively. Referring to FIGS. 7A to 8B, a process of designing the embossing pattern transfer device 1000 illustrated in FIG. 6 will be described below.

The method of manufacturing an embossing pattern of a film for laminated glass includes a preparation step, a dotting step, a connection step, and a figure setting step.

The preparation step is a step of preparing a targeted area in which areas are divided by dividing the targeted area into divided areas having the same area.

The targeted area in which area are divided may be divided more to have four or more sub area having the same area.

The targeted area refers to a certain area of a pattern applied for forming a pattern to be transferred to the film. Generally, when transferring a pattern to a film, a transfer device in a plate form or a roll form is applied as for a transfer device, and the transfer device in a plate form or a roll form transfers a pattern repetitively to the surface of the film which is extruded in a manufacture process.

The size of the targeted area is enough if the size is suitable for being arranged in the transfer device, and the wideness is not particularly limited.

The divided area divides the targeted area into divided areas having the same area. Like an example shown in FIG. 7A, the divided area is not particularly limited in the shape, but shapes such as a rectangle and a triangle and are advantageous in terms of convenience. In addition, it is advantageous that the divided area has an aspect ratio in a certain range in terms of determining a range in which dots formed in a later dotting step are located. For example, the aspect ratio of the divided area may be 2:5 to 5:2, or 3:4 to 4:3.

The divided area has four or more sub area having the same area inside each divided area. For example, the sub area may have a shape of a rectangle or a triangle, but is not limited thereto.

The sub areas included in the one divided area may be four pieces of 2×2 (width×length), nine pieces of 3×3 (width×length), or sixteen pieces of 4×4 (width×length) when the divided area has a quadrilateral shape. In this case, convenience in division of sub areas can be more enhanced.

Divided areas in one targeted area have substantially the same area among the divided areas Sub areas in one targeted area have substantially the same area among the sub areas.

Like an example illustrated in FIG. 7A, the targeted areas may be divided to have a form like graph paper, and FIG. 7A shows a case having nine sub areas in one divided area.

The dotting step is a step of putting a dot to be located in one piece among the sub areas included in the one divided area to arrange datum points. The dot has to be located in one optional sub area among the four or more sub areas, and such a dot become a datum point for pattern design hereinafter.

The datum point is formed in an optional location among four or more sub areas, therefore the probability of forming the completely same datum points in a pattern of the first film for laminated glass and a pattern of the second film for laminated glass is remarkably small. That is, each time a datum point is formed, the datum points having substantially and relatively different locations come to be formed, and this is one factor allowing respectively different patterns to be formed even when designed to show similar properties overall.

The connection step is a step of forming triangles dividing the targeted area by connecting datum points adjacent to each other among the datum points.

The triangle formed having one datum point as a vertex can be formed in various ways because two or more datum points neighbor to a datum point which is the one vertex. Among the triangles that can be formed in various ways, drawing a triangle having the smallest diameter of the circumscribed circle of the triangle is advantageous. And one side of the triangle is not intersected with one side of another triangle.

When a triangle in which datum points are connected depending on this principle is drawn, triangles are connected with each other like in FIG. 8A, so that substantially the targeted area is allowed to have a form which is divided by triangles.

The figure setting step is a step of drawing a perpendicular bisector to each of the three sides, forming an outline with the perpendicular bisectors to the point in which neighboring perpendicular bisectors meet each other, drawing outlines connected to each other and figures surrounded by the outlines, thereby setting an embossing pattern of a film for laminated glass.

When the outlines are drawn with straight lines, the figure has a shape of a polygon, and may be a form in which polygons different in the area and shape from each other, such as a triangle, a quadrilateral, a pentagon, a hexagon, a heptagon, an octagon, and so on, but are not limited thereto, are mingled inside one targeted area.

The outlines are connected in a net form to each other, and the line started from one point meeting one edge of the targeted area (boundary side) and connected through the outlines is continued without a break in a form that ends in the other point meeting the one edge or another edge (boundary side) of the targeted area.

The outlines form protrusions 20 of an embossing pattern transfer device described below, and form concavities when transferred to a film for laminated glass, thereby functioning as passages through which air flows out during a process of laminating a film for laminated glass with glass.

It is advantageous that the outlines formed to have a constant thickness, and so that the outlines cause protrusions of an embossing pattern transfer device to have a constant thickness, so that when transferred to a film, some or all of the protrusions are transferred to the film, thereby corresponding to the width of the concavities (Wc).

For example, the thickness of the outlines may be 20 to 100 μm, or 30 to 80 μm or 40 to 70 μm. When a pattern is manufactured by forming an outline with such a thickness, a film for laminated glass having more excellent deaeration performance and simultaneously having excellent edge sealing performance can be manufactured.

The number of the divided areas is the same a the number of the datum points, substantially, and this is the same as the number of the figures. Accordingly, the divided areas may be formed inside the targeted area with the same number as the number of figures to be included inside the targeted area.

The divided area may be formed in an amount of 24 to 9,800 per unit area (1 cm$^2$) of the targeted area. In this case, a pattern simultaneously enhancing deaeration performance and edge sealing performance of a film can be formed. In addition, if necessary, the number of divided areas (datum points or figures) per the unit area can be increased or decreased by reducing or enlarging the size of the pattern that has been manufactured already.

The average area of the figures in the unit area (1 cm$^2$) may be 0.01 mm$^2$ to 4.00 mm$^2$. The standard deviation of the areas of the figures in the unit area (1 cm$^2$) may be 0.01 to 0.4.

Among the figures in a unit area (1 cm$^2$), 80% or more of the figures may have an area satisfying Equation 2 below.

$$0.4 \times Fm \leq Fni \leq 1.6 \times Fm \qquad (2)$$

In Equation 2, Fni is an area of the figure, and Fm is an average area of figures in the unit area (1 cm$^2$) in which the figures are located.

When a pattern having such a distribution of figures is applied to a film for laminated glass, a pattern of a film for laminated glass having excellent optical properties as well as satisfying deaeration performance and edge sealing performance, which are trade-off performances relative to each other, in a film overall can be formed.

An example of a method of manufacturing an embossing pattern transfer device includes forming a pattern on the embossing pattern transfer device corresponding to an embossing pattern of a film for laminated glass manufactured by the method of manufacturing an embossing pattern of a film for laminated glass described above on the embossing pattern transfer device.

The outlines of the embossing pattern of the film for laminated glass are formed as protrusions in the pattern formed on the embossing pattern transfer device, and the figures of the embossing pattern of the film for laminated glass are formed as non-protrusions in the pattern formed on the embossing pattern transfer device.

Each one of the non-protrusions shares some of the protrusions with ones of the non-protrusions that are adjacent to the one non-protrusion, and either one or both of a shape and an area of each of the non-protrusions that are adjacent to the one non-protrusion may be different from either one or both of a shape and an area of the one non-protrusion.

FIG. 6 is a drawing illustrating a view from above of an example of an embossing pattern transfer device 1000. Referring to FIG. 6 the embossing pattern transfer device 1000 includes a pattern corresponding to an embossing pattern of a film for laminated glass described above and includes protrusions 20 corresponding to outlines of the embossing pattern, and non-protrusions 10 corresponding to figures of the embossing pattern.

Specifically, the embossing pattern transfer device includes non-protrusions 10, and protrusions 20 separating the non-protrusions from one another, and each one of the non-protrusions 10 shares some of the protrusions 20 with three to eight of the non-protrusions 10 that are adjacent to the one non-protrusion 10.

The average area of the non-protrusions 10 in a unit area (1 cm$^2$) may be 0.01 mm$^2$ to 4.00 mm$^2$.

The standard deviation of the areas of the non-protrusions 10 in a unit area (1 cm$^2$) may be 0.01 to 0.4.

The one non-protrusion 10 has a polygon shape surrounded by the shared protrusions 20, and either one or both of a shape and an area of the non-protrusions 10 that are adjacent to the one non-protrusion 10 is different from either one or both of a shape and an area of the one non-protrusion 10.

At least a portion of at least one side of the embossing pattern transfer device 1000 may include the non-protrusions 10 corresponding to the figures, and the protrusions 20 corresponding to the outlines and separating the non-protrusions 10 from one another.

Each one of the non-protrusions 10 shares some of the protrusions 20 with three to eight of the non-protrusions 10 that are adjacent to the one non-protrusion 10.

Either one or both of a shape and an area of each of the three to eight non-protrusions 10 that are adjacent to the one non-protrusion 10 may be different from either one or both of a shape and an area of the one non-protrusion 10.

The shape of the non-protrusions 10 may be a triangle, a quadrilateral, a pentagon, a hexagon, a heptagon, an octagon, or so on, but is not limited thereto, and the shapes may be mingled. The term "polygon" refers to a two-dimensional figure having substantially a polygon shape, and includes a case in which one or more sides of the polygon is a curve.

The embossing pattern transfer device 1000 may have a roll form or a plate form. The device having a plate form may be an embossed plate that includes the pattern illustrated in FIG. 6 formed on at least a portion of a surface of the embossed plate. The device having a roll form may be an embossed roll having the pattern illustrated in FIG. 6 formed on at least in a portion of a surface of the embossed roll.

A height of the protrusions 20, which is a difference between the heights of the protrusions 20 and the heights of the non-protrusions 10, may be 20 to 100 μm, or 30 to 80 μm, or 40 to 70 μm. When the protrusions 20 are formed to have a height in such a range, when the protrusions 20 are transferred to a film for laminated glass to form the concavities 200, a film for laminated glass having sufficient deaeration performance can be manufactured.

A example of a method of manufacturing a film for laminated glass includes a pattern forming step of transferring the surface embossing pattern described above to one side, the other side, or both sides of the film for laminated glass by applying the embossing pattern transfer device described above to the film for laminated glass. A surface embossing pattern of the film for laminated glass formed in this manner includes convexities, and concavities separating the convexities from one another, and each one of the convexities is surrounded by some of the concavities.

The pattern forming step, specifically, includes a device preparation step of preparing a first embossing pattern transfer device including a first pattern including first protrusions corresponding to first concavities of a first surface embossing pattern for one side of a film for laminated glass, and first non-protrusions corresponding to first convexities of the first surface embossing pattern, and a second embossing pattern transfer device including a second pattern including second protrusions corresponding to second concavities of a second surface embossing pattern for the other side of the film for laminated glass, and second non-protrusions corresponding to second convexities of the second surface embossing pattern; and a transfer step of transferring the first surface embossing pattern to the one side of the film for laminated glass by applying the first embossing pattern transfer device to the one side of the film for laminated glass, and transferring the second surface embossing pattern to the other side of the film for laminated glass by applying the second embossing transfer device to the other side of the film for laminated glass, thereby manufacturing a film for laminated glass having surface embossing patterns formed on both sides of the film for laminated glass.

The film for laminated glass includes a first surface embossing pattern including first concavities corresponding to the first protrusions, and first convexities corresponding to the first non-protrusions and each surrounded by some of the first concavities, on one side of the film for laminated glass. The film for laminated glass further includes a second surface embossing pattern including second concavities corresponding to the second protrusions, and second convexities corresponding to the second non-protrusions and each surrounded by some of the second concavities on the other side of the film for laminated glass.

The transfer may be carried out under a temperature of 50 to 120° C. for 2 to 10 minutes when the embossing pattern transfer device has a plate form, and in this case the surface embossing pattern can be transferred sufficiently to the film for laminated glass.

Alternatively, the transfer may be carried out under a linear pressure of 20 N/mm to 100 N/mm when the embossing pattern transfer device has a roll form, and in this case the surface embossing pattern can be transferred sufficiently to the film for laminated glass.

The pattern of the embossing pattern transfer device is transferred with 50% to 90%, thereby forming a surface embossing pattern on a film for laminated glass.

The surface embossing pattern has characteristics that there is not a big difference overall between the areas of the figures (corresponding to the convexities and the non-protrusions) in the surface embossing pattern, although the shapes of the figures are different overall, and the shapes of the outlines (corresponding to the concavities and the protrusions) do not have a regular pattern.

These characteristics have merits of obtaining an overall constant deaeration performance as well as not generating a problem of degradation of optical properties. In addition, these characteristics have a merit that whenever a pattern is formed, forming the completely same pattern is hardly possible because atypical figures are formed based on arbitrary datum points.

Hereinafter, examples will be described in further detail.

Experimental Example 1

(1) Design of Embossing Pattern and Manufacture of Embossing Pattern

Locating of dots of 810,000 irregularly on a unit plane of 45 cm×45 cm (width×length), and drawing lines that are perpendicular to a virtual line connecting dots adjacent to each other were performed, at this time the lines continued to the locations meeting an optional other line. By this method, a pattern was designed. In this time, irregularity refers to that the distance from each dot is not constant.

Specifically, after locating dots of 810,000 optionally on the unit plane, when the distance of dots adjacent to each other was smaller than a predetermined value, one dot of them was deleted, and when the distance of dots adjacent to each other was larger than a predetermined value, a dot was added. By this method, datum points arranged irregularly were generated. From the dots generated like this, polygons of about 810,000 were drawn by the method described above which includes drawing lines perpendicular to a virtual line connecting dots adjacent to each other. And a pattern completed in this manner was manufactured as an embossed plate having a 1-1 pattern and a form in which a line portion was convex, and portions of polygonal areas were concave. At this time, the depth with 40 μm and the width of a convex line portion with about 50 μm were applied. Later, transferring was performed after a sanding process.

While patterns were formed by the same method as above, using a unit plate of 45 cm×45 cm (width×length), an embossed plate having a 1-2 pattern was manufactured by a method of locating dots of about 1,400,000 irregularly, and an embossed plate having a 1-3 pattern was manufactured by a method of locating dots of about 400,000 irregularly.

When evaluated based on an embossed plate having a 1-1 pattern, it was verified that polygons of about 225 were included in a unit area of 1 cm×1 cm (width×length), and in the shape of protrusions that were lines surrounding polygons, a broken line or a non-uniform intersecting shape was not observed.

(2) Transfer of Embossing Pattern to Film

Using an embossed plate having a first pattern manufactured above, a pattern was transferred to both sides of a polyvinyl butyral film manufactured by SKC Co., Ltd. At this time, for transferring samples were prepared, in which a case of performing at 90° C. for 5 minutes was referred as a sample film 1-1, a case of performing at 80° C. for 5 minutes was referred as a sample film 1-2, and a case of performing at 70° C. for 5 minutes was referred as a sample film 1-3, so that experiments below were carried out using them.

As for the polyvinyl butyral film, a monolayer film extruded by adding a polyvinyl butyral resin in an amount of 73 wt % and a plasticizer in an amount of 27 wt % and a three-layer sound insulating film was prepared, respectively, to be applied to an experiment. The three-layer sound insulating film had a film with the same composition as above for a skin layer, and was manufactured by co-extrusion after adding a polyvinyl butyral resin in an amount of 63 wt % and a plasticizer in an amount of 37 wt % to the center as a core layer.

(3) Evaluation of Surface Roughness (Rz)

Surface roughness (Rz) was measured in accordance with DIN EN 4287:2010-7. As the result of measurement, it was verified that a sample film 1-1 had a surface roughness (Rz) of 37 to 45 μm, a sample film 1-2 had a surface roughness (Rz) of 40 to 48 μm, and a sample film 1-3 had a surface roughness (Rz) of 34 to 40 μm.

(4) Evaluation of Areas of Convexities and Distribution Thereof

The areas of convexities were evaluated by the method below.

After scanning the surface of a prepared sample film using an optical microscope, a unit area was selected, and a drawing for area calculation was made by forming lines connecting the boundary of convexities and concavities included inside the unit area. From the drawing the areas of convexities were all added up to be evaluated, and values of the areas of convexities calculated by taking ten or more different samples other were averaged out thereby determining a value of the area of a convexity in each sample.

As the result of measurement, a sample film 1-1 was evaluated as having a value of the average area of convexities of about 0.5 mm$^2$, and having a standard deviation of area distribution of about 0.13. A sample film 1-2 was evaluated as having a value of the average area of convexities of about 0.3 mm$^2$, and having a standard deviation of area distribution of about 0.07. A sample film 1-3 was evaluated as having a value of the average area of convexities of about 1 mm$^2$, and having a standard deviation of area distribution of about 0.25.

(5) Evaluation of Deaeration Performance

Deaeration performance was measured by the method of evaluation using a vacuum ring.

Specifically, after placing the sample films (diameter of 320 mm) between circle glass plates and manufacturing a laminate, installing of a vacuum ring device to the laminate was performed to evacuate the inside of a deaeration performance measurement device using a vacuum pump.

In state of being sufficiently evacuated, deaeration performance of the laminate was measured by the method of checking whether vacuum degree was maintained while changing the temperature of the laminate. To this, the principle was applied that was the vacuum degree went down when a pattern formed in a sample film was collapsed. The pressure allowing the vacuum degree to be maintained was measured at 20° C., 30° C., and 40° C. after 30 seconds from the time when the temperature reached each temperature, and the result was shown in Table 1 below. All samples showed excellent deaeration performance.

TABLE 1

| Sample Number | Deaeration Performance (20° C., cm Hg) | Deaeration Performance (30° C., cm Hg) | Deaeration Performance (40° C., cm Hg) |
| --- | --- | --- | --- |
| Sample Film 1-1 | 67 | 65 | 60 |
| Sample Film 1-2 | 70 | 70 | 66 |
| Sample Film 1-3 | 59 | 38 | 30 |

(6) Edge Sealing Evaluation

In a process of pre-lamination, if edge sealing is not sufficient, bubbles may occur in the edge part, and this becomes a cause of defects. After pre-lamination, edge sealing quality was evaluated by whether bubbles occurred in the edge and the number of occurring bubbles.

Specifically, the sample films were placed between two glass plates each having a thickness of 2.1 mm (the same below) and laminated, thereby preparing three samples, respectively. The one sample had a width of 1000 mm and a length of 1000 mm, and thus the total length of the four edges of the sample was 4 m, and three samples were prepared, and so edge sealing was evaluated from the total length of 12 m. A method of main laminating at 110° C. for 15 minutes after deaeration at 20° C. for 5 minutes using a vacuum ring was applied to sample preparation.

By evaluating with the naked eye, the number of bubble occurring within 5 mm from the edge was indicated and the edge sealing degree was evaluated. The edge sealing degree was evaluated with the sum total of bubble occurrence numbers, by the repeated experiment of 2 times.

All above samples were verified as generating bubbles of 30 or less, and so showed excellent quality, particularly Sample 2 had one or less bubble, and so was evaluated as not generating bubbles substantially.

(7) Penetration Resistance Evaluation

Penetration resistance of laminated glass was evaluated in accordance with Korean Standards Association Standard KS L 2007.

Glass with having a size of 300 m×300 mm (length×width) and a thickness of 2.1 mm and the above sample films 1-1, 1-2, and 1-3 were respectively applied to be prepared to have a laminate structure of glass-film for laminated glass-glass, and were pre-laminated in vacuum for deaeration and edge sealing. Thereafter, main lamination was performed at 150° C. for 2 hours using an autoclave to prepare samples. After that, a hard ball of 2.26 kg was dropped on the sample, and the height when a sample was penetrated by the ball (mean break height or MBH) was measured. At this time, it was evaluated as Fail if the sample was penetrated by the ball at a height under 4 m, or evaluated as Pass if the sample was penetrated by the ball at a height of 4 m or higher.

All of the laminated glasses manufactured by applying the sample films 1-1, 1-2, and 1-3, respectively, were evaluated as Pass.

(8) Impact Resistance Evaluation of Sheet

Whether or not pieces of laminated glass were missing after an impact was evaluated in accordance with Korean Standards Association Standard KS L 2007:2008 when impact resistance was evaluated.

The process of laminating glass with a thickness of 2.1 mm and sample films 1-1, 1-2, and 1-3 respectively thereby preparing a laminate structure of glass-film for laminated glass-glass were carried out in the same way with the penetration resistance evaluation as above.

As a low temperature evaluation, dropping a hard ball of 227 g was performed from a height of 9 m after the sample had been kept for 4 hours at −20° C., and it was represented as Fail if the sample was broken by the impact or 15 g or more of glass was scattered from the sample by the impact, or represented as Pass if the sample was not broken by the impact and less than 15 g of glass was scattered from the sample by the impact.

As a room temperature evaluation, dropping a hard ball of 227 g was performed from a height of 10 m after the sample had been kept for 4 hours at 40° C., and it was represented as Fail if the sample was broken by the impact or 15 g or more of glass was scattered from the sample by the impact, or represented as Pass if the sample was not broken by the impact and less than 15 g of glass was scattered from the sample by the impact.

Laminated glass manufactured by applying sample films 1-1, 1-2, and 1-3 were evaluated as Pass in both of the low temperature evaluation and the room temperature evaluation.

Experimental Example 2

(1) Design and Manufacture of Embossing Pattern

In a targeted area of 45 cm×45 cm (width×length), divided areas were formed by dividing an area with a rectangular shape of 810,000, and the divided area were divided again to have nine sub areas of 3×3 inside thereof. Though locating a datum point to one sub area out of the one divided area was performed, the sub area in which a datum point was located was determined optionally.

Though virtual lines connecting datum points adjacent to each other were drawn, the lines were allowed to form triangles connecting each datum point, and the triangles were drawn by selecting one having the smallest diameter of a circumscribed circle as possible. Though lines perpendicular to the three side of the triangle were drawn, the lines continued to the locations meeting an optional other line, and by this method a pattern was designed.

In the pattern completed in this manner, outlines were allowed to have a thickness of about 50 μm, and the pattern was used for manufacturing an embossed plate in which the outlines composed protrusions. At this time, the depth of protrusions (height of protrusion) was set at 40 μm. Thereafter through a sanding process an embossing pattern transfer device was manufactured.

When evaluated with based on the embossed plate, it was verified that the embossed plate included polygons of about 225 per unit area of 1 cm×1 cm (1 cm$^2$), and in the shape of convexities that were lines surrounding polygons, a break line or a non-uniform intersecting shape were not observed. The average area of non-protrusions of the embossed plate was evaluated as about 0.4 mm$^2$ (2-1 embossed plate).

Though manufactured in the same way as above, a sample having the average area of non-protrusions of about 0.65 mm$^2$ (2-2 embossed plate) and a sample having the average area of non-protrusions of about 0.9 mm$^2$ (2-3 embossed plate) were also manufactured.

(2) Transfer of Embossing Pattern to Film

Using embossed plates manufactured above, patterns were transferred to both sides of a polyvinyl butyral film manufactured by SKC Co., Ltd. At this time, experiments below were carried out using samples for which transferring was performed at 70 to 90° C. for 5 minutes, and the values of surface roughness (Rz) in the transferred patterns were evaluated to apply added or subtracted temperature and time depending on the value.

The polyvinyl butyral film was applied with the same one with that of experimental example 1 above.

(3) Evaluation of Surface Roughness (Rz)

Surface roughness (Rz) was measured in accordance with DIN EN 4287:2010-7. As the result of measurement, a sample film 2-1, a sample film 2-2, and a sample film 2-3 were manufactured by applying a 2-1 embossed plate, a 2-2 embossed plate, and a 2-3 embossed plate above, respectively, each had a surface roughness (Rz) of about 38 μm.

(4) Evaluation of Areas of Convexities and Distribution Thereof

The areas of convexities were evaluated by the same method with experimental example 1 above.

As the result of measurement, a sample film 2-1 was evaluated as having a value of the average area of convexities of about 0.4 mm$^2$, a sample film 2-2 was evaluated as having a value of the average area of convexities of about 0.65 mm$^2$, and a sample film 2-3 was evaluated as having a value of the average area of convexities of about 0.9 mm$^2$.

The width and depth of concavities were evaluated as follows.

As observing a section of a sample film using an optical microscope, the depth and width of convexities were measured. Though the depth and width of concavities inside a section with a thickness of 1 cm were measured, after observed in ten or more sections of different parts of a sample, the average value was determined as the width and depth of concavities. Based on a sample film 2-2, the width of concavities of 40 to 55 μm, and the depth of concavities of 30 to 45 μm were observed. In addition, it was verified that a broken line phenomenon did not occur because the concavities were connected with each other, and the intersecting shape of lines were also good.

(5) Evaluation of Deaeration Performance

Deaeration performance was measured by the method of evaluation using a vacuum ring. The detailed method of measurement was the same as that described above with respect to experimental example 1.

All the sample films had a value of 55 cm Hg to 73 cm Hg at 20° C., a value of 35 cm Hg to 73 cm Hg at 30° C., and a value of 30 cm Hg to 70 cm Hg at 40° C. A sample film 2-1 and a sample film 2-2 exhibited a characteristic which was that the pattern was not collapsed in spite of increase in temperature, because in a case of sample film 2-1, the difference between deaeration performance at 20° C. and 40° C. was within 10 cm Hg, and in a case of sample film 2-2, the difference between deaeration performance at 20° C. and 40° C. was within 5 cm Hg. But in a case of sample film 2-3, the difference between deaeration performance was within 30 cm Hg, nonetheless both deaeration and edge sealing were evaluated as good.

(6) Edge Sealing and Optical Property Evaluation

Placing the sample films between two glass plates each having a thickness of 2.1 mm (the same below) and laminating thereof were performed thereby preparing three samples. Each sample had a width of 1000 mm and a length of 1000 mm, and thus the total length of four edges of one sample was 4 m, and since three samples were prepared, and so edge sealing was evaluated from the total length of 12 m. A method of maintaining at 110° C. for 15 minutes after deaeration at 20° C. for 5 minutes using a vacuum ring was applied to preparation of samples for evaluation.

As for appearance score, by evaluating with the naked eye, a case in which the edge sealing was perfect and the pattern was not seen at all was evaluated as a 1 score, a case in which the edge sealing was good and the weak pattern was identified with the naked eye was evaluated as a 2 score, a case in which the edge sealing was ordinary and the pattern was identified with the naked eye was evaluated as a 3 score, a case in which the edge sealing was bad and the pattern was identified with the naked eye was evaluated as a 4 score, and a case in which the edge sealing was bad and the pattern was strongly identified with the naked eye was evaluated as a 5 score.

The samples were evaluated with the naked eye after main lamination, and the number of bubble occurrence was indicated, thereby evaluating the degree of edge sealing, and by performing repeated experiments of 2 times (first evaluation, second evaluation), the samples were evaluated with the sum total of the numbers of bubble occurrence. The results are shown in Table 2 below.

TABLE 2

| Sample Number | Average Area (mm$^2$) | Surface Roughness (Rz) (μm) | (1) Appearance Score | (2) First Bubble Evaluation | (3) Second Bubble Evaluation | Comprehensive Evaluation (Sum of 1~3) |
|---|---|---|---|---|---|---|
| Sample Film 2-1 | 0.4 | 38 | 4 | 0 | 1 | 5 |
| Sample Film 2-2 | 0.65 | 38 | 4 | 5 | 6 | 15 |
| Sample Film 2-3 | 0.9 | 38 | 3 | 8 | 9 | 20 |

Referring to Table 2, all of the above samples were verified as generating bubbles of 30 or less, and so showed excellent quality overall, particularly Sample 2-2 had one or less bubble and so was evaluated as not generating bubbles substantially.

The appearance score after being main laminated also shows that a pattern was not collapsed over and maintained in a certain degree, and this is thought to be one cause of having excellent deaeration performance.

From the evaluation performed after the value of surface roughness (Rz) had been controlled constantly at 38 μm, a sample in which the average area of figures was 0.4 mm$^2$ was evaluated as the one having the most excellent optical properties.

(7) Penetration Resistance Evaluation

Penetration resistance of laminated glass was evaluated in accordance with Korean Standards Association Standard KS L 2007.

Glass having a size of 300 mm×300 mm (length×width) and a thickness of 2.1 mm and the above sample films 2-1, 2-2, and 2-3 were respectively applied to be prepared to have a laminate structure of glass-film for laminated glass-glass, and were pre-laminated in vacuum for deaeration and edge sealing. The detailed method of measurement was the same at that above described with respect to experimental example 1.

As the result of measurement, all laminated glasses manufactured by applying sample films 2-1, 2-2, and 2-3 respectively were evaluated as Pass.

(8) Impact Resistance Evaluation of Sheet

Whether or not pieces of the laminated glass were missing after an impact was evaluated in accordance with Korean Standards Association Standard KS L 2007:2008 when impact resistance was evaluated. The detailed method was the same as that described above with respect to experimental example 1.

Laminated glasses manufactured by applying sample films 2-1, 2-2, and 2-3, respectively, were evaluated as Pass in both of a low temperature evaluation and a room temperature evaluation.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for laminated glass, the film comprising:
a surface embossing pattern formed on at least a portion of one side of the film,
wherein the surface embossing pattern comprises a plurality of convexities, and a plurality of concavities separating each of the plurality of convexities from one another,
wherein each of the plurality of convexities has a boundary defined by some of the plurality of concavities,
wherein an average area of the plurality of convexities is 0.01 mm$^2$ to 4.00 mm$^2$,
wherein a line shared by one of the plurality of convexities and the plurality of concavities defining the boundary of the one of the plurality of convexities forms a closed curve,
wherein each of the plurality of convexities has a shape of a polygon comprising vertexes,
an internal angle of each of the vertexes of the polygon is more than 40° and less than 180°, and
wherein the internal angles of all of the vertexes of the polygon are different from each other.

2. The film for laminated glass of claim 1, wherein the plurality of concavities intersect with each other to form lines, and
each of the lines has two or more breakpoints at which a direction of the line changes.

3. The film for laminated glass of claim 1, wherein each one of the plurality of convexities shares some of the plurality of concavities with some of the plurality of convexities that are adjacent to the one of the plurality of convexities, and
   either one or both of a shape and an area of the some of the plurality of convexities that are adjacent to the one of the plurality of convexities are different from either one or both of a shape and an area of the one of the plurality of convexities.

4. The film for laminated glass of claim 3, wherein a number of some of the plurality of convexities that are adjacent to the one of the plurality of convexities is three to eight.

5. The film for laminated glass of claim 1, wherein the surface embossing pattern formed on at least the portion of the one side of the film is a first surface embossing pattern,
   the film further comprises a second surface embossing pattern formed on at least a portion of another side of the film,
   the second surface embossing pattern comprises a plurality of convexities and a plurality of concavities separating each of the plurality of convexities of the second surface embossing pattern from one another, and
   shapes of the plurality of convexities in a unit area of 1 cm² of the first surface embossing pattern are different from shapes of the plurality of convexities in a unit area of 1 cm² of the second surface embossing pattern.

6. The film for laminated glass of claim 1, wherein the one side of the film comprises a concavity A, a concavity B, and a concavity C in a cross-section of a unit area of 1 cm²,
   the concavity B is adjacent to the concavity A,
   the concavity C is adjacent to the concavity B, and
   a distance between the concavity A and the concavity B is different from a distance between the concavity B and the concavity C.

7. The film for laminated glass of claim 1, wherein there are 24 to 9,800 convexities in a unit area of 1 cm² of the surface embossing pattern, and
   a standard deviation of areas of the convexities in the unit area of 1 cm² of the surface embossing pattern is 0.01 to 0.4.

8. The film for laminated glass of claim 1, wherein the internal angles of two or more of the vertexes of the polygon are equal to each other, and the internal angles of remaining ones of the vertexes of the polygon are different from each other remaining ones of the vertexes.

9. The film for laminated glass of claim 1, wherein a value of deaeration performance of the film at 40° C. is 80% or more of a value of deaeration performance of the film at 20° C.

10. The film for laminated glass of claim 1, wherein each of the plurality of convexities has a shape of a polygon, and
    the polygon is any one of a triangle, a quadrilateral, a pentagon, a hexagon, a heptagon, and an octagon.

11. The film for laminated glass of claim 1, wherein the plurality of concavities intersect with each other to form a line that begins at a start point where one of the plurality of concavities intersects a first edge of the surface embossing pattern, and extends along intersecting ones of the plurality of concavities to an end point where another one of the plurality of concavities intersects the first edge of the surface embossing pattern or a second edge of the surface embossing pattern.

12. The film for laminated glass of claim 1, wherein 80% or more of the plurality of convexities in a unit area of 1 cm² of the surface embossing pattern have an area satisfying the following equation:

$$0.4 \times Sm \leq Sni \leq 1.6 \times Sm$$

where Sni is an area of a convexity in the unit area of 1 cm², and Sm is an average area of the plurality of convexities in the unit area of 1 cm².

13. The film for laminated glass of claim 1, wherein the surface embossing pattern formed on at least the portion of the one side of the film is a first surface embossing pattern,
    the film for laminated glass further comprises a second surface embossing pattern formed on at least a portion of another side of the film opposite to the one side of the film,
    the second surface embossing pattern comprises a plurality of convexities, and a plurality of concavities separating the plurality of convexities of the second surface embossing pattern from one another;
    the plurality of concavities of the first surface embossing pattern comprise a first concavity and a third concavity,
    the plurality of concavities of the second surface embossing pattern comprise a second concavity and a fourth concavity,
    the first concavity, the second concavity, the third concavity, and the fourth concavity are disposed in a unit area of 1 cm² of the film when the film is viewed in a direction perpendicular to the one side of the film and the other side of the film,
    the first concavity and the second concavity are adjacent to each other and a distance between the first concavity and the second concavity is d1 when the film is viewed in a cross-section of the unit area of 1 cm² of the film,
    the third concavity and the fourth concavity are adjacent to each other and a distance between the third concavity and the fourth concavity is d2 when the film is viewed in the cross-section of the unit area of 1 cm² of the film, and
    d1 and d2 are different from each other.

14. The film for laminated glass of claim 1, wherein the boundary is further defined by a plurality of concavities that are immediately adjacent to the each of the plurality of convexities.

15. The film for laminated glass of claim 1, wherein the plurality of convexities are coplanar.

16. A method of manufacturing a film for laminated glass, the method comprising:
    preparing an untreated film, a first embossing pattern transfer device comprising a first pattern, and a second embossing pattern transfer device comprising a second pattern; and
    transferring the first pattern of the first embossing pattern transfer device to one side of the untreated film, and transferring the second pattern of the second embossing pattern transfer device to another side of the untreated film opposite the one side of the untreated film, thereby preparing a film for laminated glass,
    wherein the first pattern of the first embossing pattern transfer device comprises first non-protrusions, and first protrusions separating the first non-protrusions from one another and being connected to each other so that each of the first non-protrusions has a boundary defined by some of the first protrusions,
    the second pattern of the second embossing pattern transfer device comprises second non-protrusions, and second protrusions separating the second non-protrusions from each other and being connected to each other so that each of the second non-protrusions has a boundary defined by some of the second protrusions,
one side of the film for laminated glass comprises a first surface embossing pattern,
another side of the film for laminated glass opposite the one side of the film for laminated glass comprises a second surface embossing pattern,
the first surface embossing pattern comprises:
- a plurality of first convexities corresponding to the first non-protrusions of the first pattern of the first embossing pattern transfer device; and
- a plurality of first concavities corresponding to the first protrusions of the first pattern of the first embossing pattern transfer device, the plurality of first concavities separating the plurality of first convexities from each other and being connected to each other so that each of the plurality of first convexities has a boundary defined by some of the plurality of first concavities, the second surface embossing pattern comprises:
- a plurality of second convexities corresponding to the second non-protrusions of the second pattern of the second embossing pattern transfer device; and
- a plurality of second concavities corresponding to the second protrusions of the second pattern of the second embossing pattern transfer device, the plurality of second concavities separating the plurality of second convexities from each other and being connected to each other so that each of the plurality of second convexities has a boundary defined by some of the plurality of second concavities, an average area of the first convexities is 0.01 mm$^2$ to 4.00 mm$^2$, and an average area of the second convexities is 0.01 mm$^2$ to 4.00 mm$^2$, wherein a line shared by one of the plurality of convexities and the plurality of concavities defining the boundary of the one of the plurality of convexities forms a closed curve, wherein each of the plurality of convexities has a shape of a polygon comprising vertexes, an internal angle of each of the vertexes of the polygon is more than 40° and less than 180°, and wherein the internal angles of all of the vertexes of the polygon are different from each other.

* * * * *